US012670245B2

(12) United States Patent
Mullins et al.

(10) Patent No.: US 12,670,245 B2
(45) Date of Patent: Jun. 30, 2026

(54) UTILIZING MACHINE-LEARNING MODELS TO DETERMINE TAKE-OVER SCORES AND INTELLIGENTLY SECURE DIGITAL ACCOUNT FEATURES

(71) Applicant: Chime Financial, Inc., San Francisco, CA (US)

(72) Inventors: Brian Mullins, San Francisco, CA (US); Jiby Babu, Austin, TX (US); Nik Shevyrev, San Mateo, CA (US); Parin Shah, Burnaby (CA)

(73) Assignee: Chime Financial, Inc., San Francisco, CA (US)

( * ) Notice: Subject to any disclaimer, the term of this patent is extended or adjusted under 35 U.S.C. 154(b) by 8 days.

(21) Appl. No.: 18/999,682

(22) Filed: Dec. 23, 2024

(65) Prior Publication Data

US 2025/0124124 A1      Apr. 17, 2025

Related U.S. Application Data

(63) Continuation of application No. 17/574,144, filed on Jan. 12, 2022, now Pat. No. 12,174,943.

(51) Int. Cl.
| | |
|---|---|
| *G06F 21/54* | (2013.01) |
| *G06F 21/31* | (2013.01) |
| *G06F 21/51* | (2013.01) |
| *G06F 21/62* | (2013.01) |

(52) U.S. Cl.
CPC ............ *G06F 21/54* (2013.01); *G06F 21/316* (2013.01); *G06F 21/51* (2013.01); *G06F 21/6245* (2013.01)

(58) Field of Classification Search
CPC ........ G06F 21/54; G06F 21/316; G06F 21/51; G06F 21/6245

USPC .......................................................... 726/26
See application file for complete search history.

(56) References Cited

U.S. PATENT DOCUMENTS

| | | | |
|---|---|---|---|
| 7,980,464 | B1 | 7/2011 | Sarris et al. |
| 9,710,804 | B2 | 7/2017 | Zhou et al. |
| 10,891,372 | B1 | 1/2021 | Shahbazi et al. |
| 2014/0162598 | A1 | 6/2014 | Villa-Real |
| 2019/0018956 | A1* | 1/2019 | Sadaghiani ............. G06F 21/31 |
| 2020/0374283 | A1 | 11/2020 | Rakshit et al. |
| 2022/0020033 | A1* | 1/2022 | Epstein .............. G06Q 30/0185 |

OTHER PUBLICATIONS

U.S. Appl. No. 17/574,144, filed Jan. 9, 2024, Office Action.
U.S. Appl. No. 17/574,144, filed Apr. 5, 2024, Office Action.
U.S. Appl. No. 17/574,144, filed Sep. 10, 2024, Notice of Allowance.

* cited by examiner

*Primary Examiner* — Jacob Lipman
(74) *Attorney, Agent, or Firm* — Nicholson De Vos Webster & Elliott LLP

(57) ABSTRACT

The present disclosure relates to systems, non-transitory computer-readable media, and methods for utilizing machine-learning models to determine take-over scores and intelligently provide or limit access to account features. In particular, in one or more embodiments, the disclosed systems can train and utilize digital security machine-learning models to generate a take-over score indicating a likelihood that the request to access the secure digital account is unauthorized activity. Based on the determining that the take-over score satisfies a take-over threshold, the disclosed systems can allow access to the secure digital account by providing secure account information but prohibit access to a subset of account features.

20 Claims, 11 Drawing Sheets

700

Receiving A Request To Access A Secure Digital Account _702_

Extracting One Or More Features Corresponding To The Client Device _704_

Generating A Take-Over Score _706_

Determine The Take-Over Satisfies A Take-Over Threshold _708_

Allow Access To The Secure Digital Account _710_

Prohibit Access To A Subset Of Account Features _712_

UTILIZING MACHINE-LEARNING MODELS TO DETERMINE TAKE-OVER SCORES AND INTELLIGENTLY SECURE DIGITAL ACCOUNT FEATURES

CROSS-REFERENCE TO RELATED APPLICATIONS

The present application is a continuation of U.S. application Ser. No. 17/574,144, filed on Jan. 12, 2022. The aforementioned application is hereby incorporated by reference in its entirety.

BACKGROUND

Recent years have seen significant developments in network security systems that store and manage confidential information across computer networks. Indeed, the expanded use of online digital data repositories allows client devices to manage digital accounts over computer networks using a web or mobile application on a computing device. For instance, conventional network security systems can receive, manage, and display sensitive digital data corresponding to various client accounts while attempting to maintain the security of this sensitive digital data.

Despite these recent advances, however, conventional systems continue to exhibit a number of drawbacks or deficiencies. For example, some conventional systems are insecure. In particular, as the popularity and usage of digital accounts storing confidential information has grown, the number of account take-over events (ATO events) has steadily increased. For example, digital pirates utilize a variety of approaches (such as phishing schemes compromising network credentials), to infiltrate and take control of digital accounts from external computing devices. Accordingly, when computing devices enter correct login credentials, conventional systems cannot determine whether a client device associated with a secure user has provided the information or whether the system has become susceptible to an ATO event. Indeed, digital pirates have even been able to circumvent two-factor authentication schemes through approaches that take control of authentication pipelines. Additionally, once a digital pirate takes over a user account, external devices quickly access and utilize digital rights associated with the account (e.g., to transfer information or resources).

In addition to security concerns, conventional systems also suffer from accuracy problems. For instance, existing systems utilize inaccurate algorithms that frequently mistake client devices associated with a digital account for unauthorized devices. This often results in inaccurately locking digital accounts from authorized users and client devices.

Due at least in part to their inaccuracy, conventional systems also suffer from system inefficiencies and disruptions. For instance, existing systems prohibit client devices from utilizing a digital account, which disrupts system operation and access to digital information. Accordingly, conventional systems often expend significant computational resources, such as computing time and processing power, in generating, transmitting, and processing digital communications to resolve these disruptions (e.g., responding to queries from authorized client devices, generating and transmitting error messages, and processing interactions to accomplish re-authentication procedures).

SUMMARY

This disclosure describes one or more embodiments of methods, non-transitory computer-readable media, and systems that solve the foregoing problems in addition to providing other benefits by utilizing a machine-learning model to determine takeover scores and intelligently provide dynamic access to different account features based on the takeover scores. For example, the disclosed systems can receive a request to access a secure digital account and extract features corresponding to a client device associated with the request. The disclosed systems can then utilize a digital security machine-learning model to generate a takeover score based on the extracted features. In one or more embodiments, the disclosed systems utilize the take-over score and a take-over threshold to intelligently provide access to a subset of specific account features.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
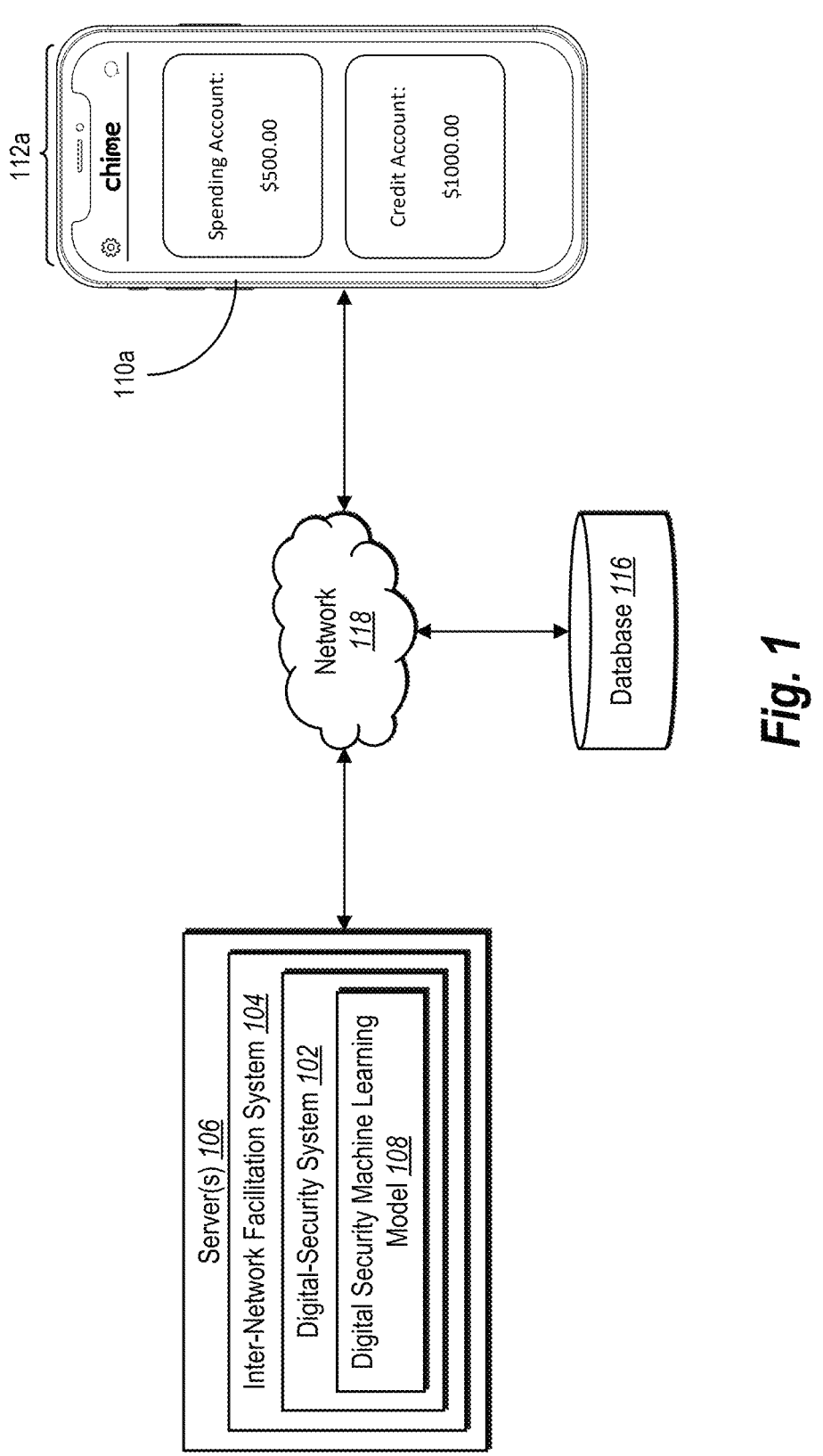
FIG. 1 illustrates a block diagram of an environment in which a digital security system can operate in accordance with one or more embodiments.

This disclosure describes embodiments of a digital security system that utilizes machine-learning models to determine take-over scores corresponding to computing devices and utilizes the take-over scores to intelligently provide (or limit) access to account features. To elaborate, the digital security system can receive a request from a client device to access a secure digital account. Although the request from the client device can include appropriate credentials for accessing the digital account, the digital security system can utilize a machine-learning model to determine whether the request is actually an account take over event. For example, the digital security system can extract features corresponding to the client device. The digital security system can then utilize a digital security machine-learning model to generate a take-over score based on the extracted features. Based on the take-over score the digital security system can intelligently control account features that the client device is permitted to access.

For example, as just mentioned, the digital security system can extract features of a client device associated with a request to access a secure digital account. To illustrate, the digital security system can determine one or more features of a client device requesting to access the secure digital account and compare those features with historical features of an accessing client device (e.g., a client device associated with accessing the secure digital account). In some instances, extracting features can include determining an internet protocol (IP) address corresponding to the client device requesting to access the secure digital account and comparing that IP address with a historical IP address associated with an accessing client device. Furthermore, extracting features can include extracting a number of accounts accessed by the client device or a number of failed logins from an IP address.

Based on the extracted features, the digital security system can then utilize a digital security machine-learning model to generate a take-over score. The digital security machine-learning model is trained on known features of client devices associated with digital accounts. As explained further below, the digital security machine-learning model can take various forms, including, for example, gradient boosted decision trees (e.g., CatBoost algorithm) or a neural network.

As noted above, the digital security system can utilize the take-over score and one or more take-over thresholds to intelligent modify access to different account features. For example if a take-over score does not satisfy a take-over threshold, the digital security system can allow full access to all features of a digital account. However, based on comparing the take-over score and the take-over threshold, the digital security system can limit access to some features of the secure digital account. In some implementations, the digital security system initiates an additional identification verification workflow (e.g., directing the client device to verify identity by uploading an ID and self-portrait) before gaining access to account features.

To illustrate, in response to determining that a take-over score satisfies a take-over threshold, the digital security system can allow access to a first subset of features of the digital account while prohibiting access to a second subset of features of the digital account. For instance, the digital security system can provide some secure digital account information for display on a client device (e.g., account balances or transactions associated with the secure digital account). Even though the digital security system allows access to some information associated with the secure digital account, the digital security system can prohibit access to a subset of account features. For instance, the digital security system can detect a request to access a certain account feature (e.g., money transfer or virtual card feature) and prohibit a client device from accessing that feature.

The digital security system provides several technical advantages over existing systems. For example, the digital security system can increase security over conventional systems by preventing access to susceptible features of a secure digital account, even when client devices provide access credentials. Indeed, by prohibiting access to the most sensitive features of an account when a take-over score satisfies a take-over threshold, such as money transfer features (e.g., via peer-to-peer transaction) or virtual card features, the digital security system is more secure than conventional finance management systems. As noted above, conventional online finance systems may utilize two-factor or multi-factor authentication systems that are often circumnavigated. In contrast, by extracting features corresponding to the client device and utilizing a trained digital security machine-learning model, the digital security system can detect ATO events between client devices requesting to access a secure digital account even when a client device correctly enters login credentials, thus providing more security than existing systems.

The digital security system can also improve accuracy relative to conventional systems. As noted above, conventional systems often inaccurately identify client devices associated with a secure digital account. In contrast, by utilizing a trained digital security machine-learning model, the digital security system can quickly and accurately identify whether a client device is associated with a secure digital account based on features of the client device. Accordingly, the digital security system can avoid unnecessarily blocking client devices from client accounts.

In part because of this improved accuracy, the digital security system can also improve efficiency and reduce system disruptions. As suggested above, some existing online finance management systems suffer from system disruptions due to inaccurately and excessively blocking client devices from digital accounts. By contrast, the digital security system can more accurately identify account takeovers and reduce such inefficiencies. Moreover, even in situations where a take-over score satisfies a take-over threshold (denoting an elevated risk of unauthorized activity or an ATO event), the digital security system can intelligently remove a subset of account features (rather than blocking the account altogether). Accordingly, even in a rare instance of inaccurately identifying an ATO event, the digital security system can improve efficiency by intelligently prohibiting access only to a subset of account features based on the take-over score. In this manner, the digital security system can provide limited access to legitimate users while preserving security where digital signals indicate an increased likelihood of a take-over event.

As illustrated by the foregoing discussion, the present disclosure utilizes a variety of terms to describe features and benefits of the digital security system. Additional detail is now provided regarding the meaning of these terms. As used herein, the term "machine-learning model" refers to a computer algorithm or a collection of computer algorithms that automatically improve a particular task through experience based on the use of data. For example, a machine-learning model can improve accuracy and/or effectiveness by utilizing one or more machine-learning techniques. Example machine-learning models include various types of decision trees, support vector machines, Bayesian networks, or neural networks.

As mentioned, in some embodiments, the digital security machine-learning model can be a neural network. The term "neural network" refers to a machine-learning model that can be trained and/or tuned based on inputs to determine classifications or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data. For example, a neural network can include a convolutional neural network, a recurrent neural network (e.g., an LSTM), a graph neural network, a self-attention transformer neural network, or a generative adversarial neural network.

In some cases, the machine-learning model comprises a digital security machine-learning model. As used herein, the term "digital security machine-learning model" refers to a machine-learning model trained or used to detect a security breach (e.g., an account take-over event, where a user or device access an account that does not belong to the user or device). In some cases, the digital security machine-learning model refers to a trained machine-learning model that generates a take-over score or take-over classification for a request to access a secure digital account. For example, the digital security machine-learning can utilize a series of gradient boosted decision trees (e.g., CatBoost algorithm). In other cases, the digital security machine-learning model is a random forest model, a multilayer perceptron, a linear regression, a support vector machine, a deep tabular learning architecture, a deep learning transformer (e.g., self-attention-based-tabular transformer), or a logistic regression model.

As used herein, the term "secure digital account" refers to a collection of digital information (e.g., a collection of sensitive information corresponding to a user within an online system that utilizes various security methods to protect the sensitive information therein). For instance, a secure digital account can include a financial account, a personal information account, or a password or key account maintained at one or more remote servers. Thus, sensitive information stored within a secure digital account can include digital information that carries an increased risk of being subject to an account take-over event, such as credit card numbers or passwords.

As used herein, the term "take-over score" refers to a measure, classification, or metric indicating whether a request to access a secure digital account is unauthorized activity (e.g., there is a risk the request is an account take-over event). In some embodiments, a take-over score comprises a value indicating a likelihood that a request is from an external (e.g., fraudulent) computing device that is not permitted to access a digital account. For example, a take-over score can comprise a numerical score (e.g., a number, a fraction, or other numerical indicators) indicating a degree to which a digital security machine-learning model predicts a request to access a secure digital account is an account take-over event. In other embodiments, the take-over score could be a classifier (e.g., a binary classification, such as a "0" or a "1") indicating a prediction that the request to access a secure digital account is an account take-over event.

As used herein, the term "historical features" refers to features of a user or client device associated with a user account prior to a system receiving a request to access a secure digital account. In some embodiments, historical features could be features of a client device previously associated with the user account. In some embodiments, historical features can include features of the client device for a previous session for accessing the secure digital account, such as device model, device identification features, or device operating system utilizes to access the secure digital account. In other embodiments, historical features could be features of a network associated with the client device, such as an internet protocol address.

As used herein, the term "virtual card feature" refers to an electronic charge or lending feature associated with a secure digital account. Accordingly, the virtual card feature can include secure information about a credit card (e.g., the account numbers, expiration date, card verification value).

As used herein, the term "accessing client device" refers to a client device that transmits a request to access a secure digital account. For instance, an accessing client device includes a device that accesses a secure digital account, such as by using credentials associated with the secure digital account. For example, an accessing client device can be a client device previously used to access a secure digital account prior to a current request.

As used herein, the term "digital account feature" refers to an option, sub-portion, sub-routine, or information portion of a secure digital account. In some embodiments, a digital account feature can include features that include sensitive information or performs acts involving sensitive information. For example, a digital account feature can include a feature that transfers money to an external account.

Additional detail regarding the digital security system will now be provided with reference to the figures. In particular, FIG. 1 illustrates a block diagram of a system environment for implementing a digital security system 102 in accordance with one or more embodiments. As shown in FIG. 1, the environment includes server(s) 106 housing the digital security system 102 as part of an inter-network facilitation system 104. As illustrated, the digital security system 102 further includes the digital security machine-learning model 108. The environment of FIG. 1 further includes client device 112a with corresponding client application 110a and database 116. The server(s) 106 can include one or more computing devices to implement the digital security system 102. Additional description regarding the illustrated computing devices (e.g., the server(s) 106, the client device 112a, and the network 118) is provided with respect to FIGS. 8-9 below.

As shown, the digital security system 102 utilizes a network 118 to communicate with the client device 112a and the database 116. The network 118 may comprise a network described in FIGS. 11-12. For example, the digital security system 102 communicates with client device 112a to provide and receive information pertaining to accessing secure digital accounts. Indeed, the inter-network facilitation system 104 or the digital security system 102 can receive a request to access a secure digital account from client device 112a. In response, the digital security system 102 can utilize the digital security machine-learning model 108 to generate a take-over score and, if the take-over score satisfies a take-over threshold, prohibit access to a subset of account features.

As indicated by FIG. 1, the client device 112a respectively includes a client application 110a. In one or more embodiments, the inter-network facilitation system 104 or the digital security system 102 communicate with the client device 112a to, for example, receive and provide information including an account associated with the client device 112a, device features, account features, and network features. For example, the digital security system 102 receives a request to access a secure account from client device 112a through the client application 110a, respectively.

In some embodiments, the inter-network facilitation system 104 or the digital security system 102 can provide (and/or cause the client device 112a to display or render) visual elements within a graphical user interface associated with client device 112a (e.g., within client application 110a). For example, the inter-network facilitation system 104 or the digital security system 102 can provide a graphical user interface that can provide secure account information via the client device 112a.

Although FIG. 1 illustrates the environment having a particular number and arrangement of components associ-

US 12,670,245 B2

Page 7 / 8

7 ated with the digital security system 102, in some embodiments, the environment may include more or fewer components with varying configurations. For example, in some embodiments, the inter-network facilitation system 104 or the digital security system 102 can communicate directly to the client device 112a, bypassing the network 118. In these or other embodiments, the inter-network facilitation system 104 or the digital security system 102 can be housed (entirely or in part) on the client device 112a. Additionally, the inter-network facilitation system 104 or the digital security system 102 can include or communicate with a database for storing information, such as account information or network transaction information.

Figure 2:
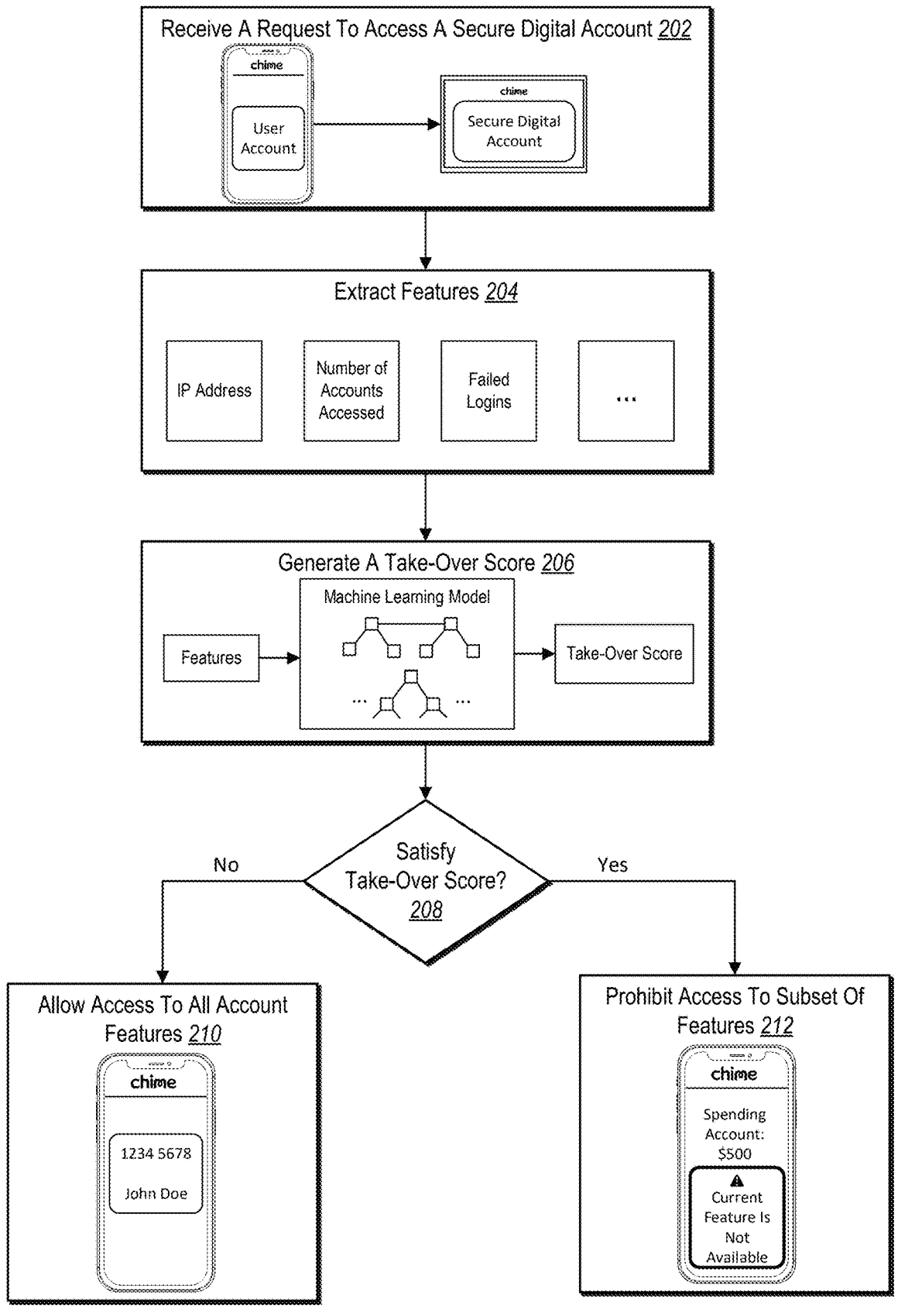
FIG. 2 illustrates an example sequence flow for a digital security system generating a take-over score and varying access to account features based on the take-over score in accordance with one or more embodiments.

As mentioned, in some embodiments, the digital security system 102 can utilize a digital security machine-learning model to determine a take-over score corresponding to a computing device and utilize the take-over score to intelligently provide or limit access to account features. FIG. 2 illustrates an overview of the digital security system 102 utilizing a digital security machine-learning model to determine a take-over score corresponding to a computing device and utilizing the take-over score in accordance with one or more embodiments.

As illustrated in FIG. 2, the digital security system 102 performs an act 202 of receiving a request to access a secure digital account. In particular, the digital security system 102 receives a request from a client device (e.g., the client device 112a). For example, the digital security system 102 can receive access or login credentials from a client device. In some cases, the digital security system 102 can receive access or login credentials from a client application on a client device (e.g., the client application 110a) that correspond to a user account within the inter-network facilitation system 104. As shown, the digital security system 102 receives a request to access a secure digital account from a client device that is associated with a user account in the inter-network facilitation system 104.

As further illustrated in FIG. 2, the digital security system 102 performs an act 204 to extract features associated with a client device making a request to access a secure digital account. In particular, the digital security system 102 can extract or identify features of the client device from among various feature groups or individual features. For example, the digital security system 102 can identify an IP address corresponding to the client device as well as a historical IP address utilized by previous accessing devices to access the secure digital account. Additional detail regarding extracting features corresponding to client devices is provided below (e.g., in relation to FIGS. 3-4).

Additionally, the digital security system 102 performs an act 206 to generate a take-over score. More specifically, the digital security system 102 generates a take-over score by utilizing a digital security machine-learning model (e.g., the digital security machine-learning model 108). For example, the digital security system 102 utilizes the digital security machine-learning model to process or analyze one or more features associated with a client device associated with the request to access a secure digital account. As shown, the digital security machine-learning model can be a series of gradient boosted trees (e.g., Cat Boost algorithm), or the digital security machine-learning model can be a neural network, or other machine-learning model. Additional detail regarding training and utilizing a digital security machine-learning model is provided below (e.g., in relation to FIG. 3).

As mentioned above, the take-over score reflects how likely it is that the request to access a secure digital account is an account take-over event or other security breach. The take-over score can be a continuous score (e.g., 0.64) or a binary classifier (e.g., a "0" or "1") indicating that the request to access a secure digital account is or is not an account take-over event. As shown, the take-over score is a score of 0.64. Based on the take-over score satisfying certain thresholds, the digital security system can intelligently allow access to account features, for example by allowing access to all account features or prohibiting access to a subset of account features.

As further illustrated in FIG. 2, the digital security system 102 performs an act 208 of determining if the take-over score satisfies a take-over threshold. For example, the take-over threshold can be a level or threshold at which there is a likelihood or probability that the request to access a secure digital account is an account take-over event. For example, the take-over threshold could be when the take-over score is above a certain numerical value (e.g., above 0.65). Additional detail regarding determining the take-over score and applying take-over score thresholds is provided below (e.g., in relation to FIG. 4).

The digital security system 102 can perform additional acts based on a take-over score satisfying or not satisfying a take-over threshold. For example, as further illustrated in FIG. 2, the digital security system can perform an act 210 and allow access to all account features if the take-over score does not satisfy a take-over threshold. In particular, the digital security system 102 can allow access to sensitive account features, such money transfer features (e.g., via peer-to-peer transaction) or virtual card features. As shown, the digital security system 102 allows access to all account features by allowing a client device to view a virtual card feature.

As further illustrated in FIG. 2, if a take-over score satisfies a take-over threshold, the digital security system 102 can perform an act 212 and prohibit access to a subset of account features. In particular, in response to a request to access certain features (e.g., sensitive features), the digital security system can prohibit the client device from accessing the certain features. As shown, the digital security system 102 prohibits access to a subset of account features by displaying a visual indicator stating the current feature is not available. In other embodiments, the digital security system 102 does not provide a visual indicator that an account feature is unavailable but takes a different approach to withholding the account feature (e.g., does not provide an option to access the account feature within the user interface).

Figure 3:
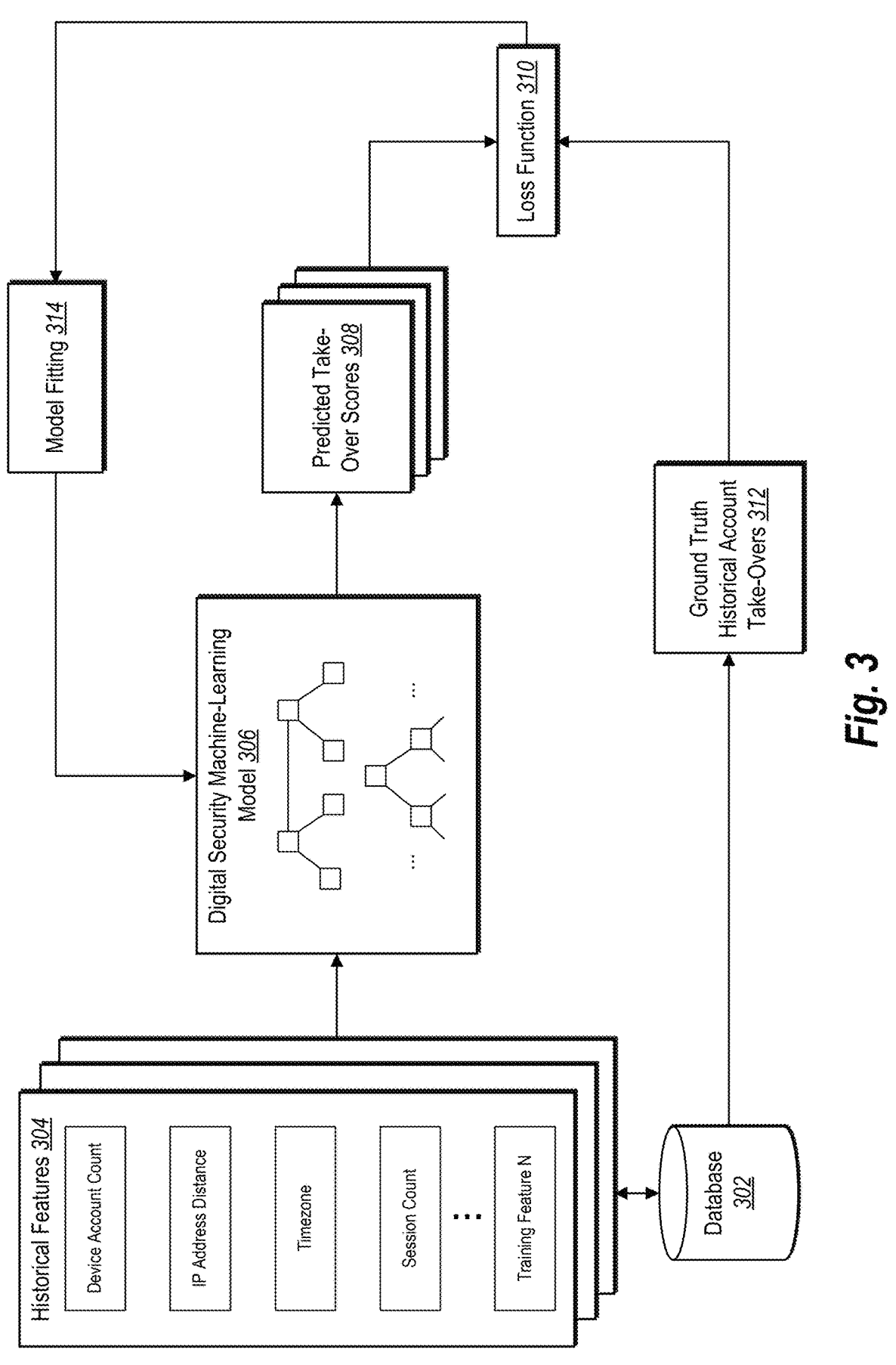
FIG. 3 illustrates a flowchart of a series of acts for training a digital security machine-learning model in accordance with one or more embodiments.

As mentioned above, in certain embodiments, the digital security system trains or tunes a digital security machine-learning model. In particular, the digital security system 102 utilizes an iterative training process to fit a digital security machine-learning model by adjusting or adding decision trees or learning parameters that result in accurate take-over scores. FIG. 3 illustrates training a digital security machine-learning model in accordance with one or more embodiments.

As illustrated in FIG. 3, the digital security system 102 accesses historical features 304 from a database 302 (e.g., the database 116). In particular, the historical features 304 can indicate feature sets where each feature set corresponds to a historical request to access a digital account. For example, the digital security system 102 can access historical features by accessing the database 302, which contains recorded features about client devices and requests associated with secure digital accounts. In some embodiments, the digital security system 102 accesses historical features by accessing historical device characteristics of accessing devices, including the operating system of the client device (e.g., iOS or Android), the model of the client device (e.g., iPhone or Samsung), the model version of the client device, a name of the client device, or the time zone of the client device. In other embodiments, the digital security system 102 can accesses historical features by accessing a historical IP address for the client device associated with the account. The digital security system 102 also access and analyze a number of failed logins from a particular IP address.

In one or more embodiments, the digital security system 102 can identify historical features of a first accessing client device and compare those historical features to another client device. The digital security system 102 can then utilize these comparisons as additional features (i.e., device comparison features). For example, the digital security system 102 can determine a first IP address (of a first accessing device) and a second IP address (of a second accessing device) and compare distances between the IP addresses. In particular, the digital security system 102 can determine locations corresponding to the first IP address and the second IP address and determine distances between the locations. The digital security system 102 can then utilize this IP address distance as an additional historical feature. To illustrate, the digital security system 102 can utilize distances between IP address within 1 hour (or another threshold time period, such as a week/7 days or a month) as a historical feature.

In addition to IP address, the digital security system 102 can compare a variety of other historical features to generate device comparison features. For example, the digital security system 102 can consider (and/or compare) time zones, device platforms/operating systems, cell phone carriers, cellular networks, and/or Wi-Fi networks as features.

Similarly, the digital security system 102 can aggregate historical features. For example, the digital security system 102 can track the number of users or accounts associated with a particular device. The digital security system 102 can aggregate these account device counts and utilize the account device counts as an additional feature. To illustrate, one historical feature can include the number of accounts/ users associated with a device within the past 30 days (or another threshold time period such as a week or an hour). The digital security system 102 can also consider the number of sessions corresponding to a device (e.g., within a week or a month). In sum, the digital security system 102 can analyze the number of accounts and sessions accessed from the same device, IP address, and/or network over a particular threshold (e.g., one, seven, or thirty days). The digital security system 102 can consider a variety of differences in counts relative to a variety of features computed over various time windows.

The digital security system 102 can also access historical features by accessing historical account features. For example, the digital security system 102 can access historical account features by determining information about the secure digital account, such as name, login credentials, or location. The digital security system 102 can also consider changes in personal identifiable information (e.g., within a threshold time period).

Furthermore, the digital security system 102 can accesses a historical device ID of a client device associated with the secure digital account, such as an identifying number or code. In some embodiments, a historical device ID can be a unique hardware or manufacturer device ID (e.g., Apple UDID). In other embodiments, a device ID could be an International Mobile Equipment Identity (IMEI), a Type Allocation Code (TAC), Media Access Control (MAC) address, advertising ID, Identifier for Advertisers (IDFA), Google Advertising ID (AAID), or cookie ID.

In some cases, the historical features 304 have corresponding ground truth historical account take-overs 312 associated with them, where the ground truth historical account take-overs 312 can include ground-truth labels or classifications indicating whether a particular interaction reflected in the historical client device features 304 was an account take-over event (or not an account take-over event). The ground truth historical account take-over labels 312 can have a ground truth take-over corresponding to each subset of historical features.

The digital security system 102 can utilize a variety of approaches to efficiently and accurately determine historical client device features 304 and whether the historical client device features 304 correspond to positive or negative ground truth take-over labels. For example, in one or more embodiments, the digital security system 102 considers sessions with known device ID (and filters web sessions) for ground truth take-over labels. In some embodiments, the digital security system 102 considers sessions created with a new device ID in identifying a positive ground truth take-over and filters other sessions (i.e., because fraudsters are less likely to create consecutive sessions). Similarly, the digital security system 102 can filter the very first session for a user or account (as fraudsters are unlikely to create a brand new account).

In one or more embodiments, the digital security system 102 determines positive ground truth take-over labels where a new session was created within a threshold time (e.g., less than five minutes) prior to an account take-over transaction was added. In addition, the digital security system 102 can determine positive ground-truth takeovers where a session was created within 5 minutes after a new device ID was seen with member account. Moreover, in some embodiments, the digital security system 102 can determine that the session prior to an account take-over is not an account take-over (and can generate a negative ground truth take-over label based on this determination). Similarly, sessions created within a threshold time period (e.g., less than 4 hours) prior to certain transaction types (e.g., purchases) are also labeled as negative ground truth take-overs. In one or more embodiments, the digital security system 102 identifies sessions with new devices which led to a disputed transaction (e.g., disputed by a member) where the dispute claim was approved and utilizes these sessions as positive ground truth take-over events.

Thus, in some embodiments, the digital security system 102 monitors interactions of a set of client devices (e.g., identifying account log-ins, access, and features). The digital security system 102 then filters these interactions based on various factors to identify positive or negative ground truth take-over labels. For example, the digital security system 102 can filter these interactions based on client device inconsistencies (e.g., new device ID or other differences described above) and/or time thresholds (e.g., new device ID within the past 5 minutes). The digital security system 102 can utilize this approach to verify the accuracy of utilizing monitored interactions as training samples. The digital security system 102 can also extract historical features for the set of client devices (e.g., those client devices corresponding to positive or negative ground truth historical account take-overs) and further train the model. Specifically, the digital security system can utilize the historical features to generate a plurality of predicted take-over scores and compare the predicted take-over scores to the ground truth take-overs (e.g., the ground truth take-over labels).

As further illustrated in FIG. 3, the digital security system 102 generates predicted take-over scores 308 based on the historical features 304. For example, the digital security system 102 can encode the historical features 304 utilizing a variety of encoding methods (e.g., one-hot encoding an encoding algorithm and/or an encoding neural network). The digital security system 102 can then process the feature encodings utilizing the digital security machine-learning model 306. For instance, where the digital security machine-learning model 306 comprises a decision tree, the nodes of the digital security machine-learning model 306 can analyze the feature encodings and traverse along paths of the decision tree to generate a predicted take-over score. Similarly, where the digital security machine-learning model 306 comprises a neural network, layers of the digital security machine-learning model 306 can analyze the feature encodings (e.g., at different levels of abstraction and/or in different combinations) to generate a predicted take-over score.

Accordingly, the digital security system 102 utilizes a digital security machine-learning model 306 to generate predicted take-over scores 308 based on the historical features 304. In some embodiments, the digital security machine-learning model 306 generates a set of predicted take-over scores, including a predicted take-over classification with a corresponding probability that a request to access a secure digital account is associated with an account take-over event.

As further illustrated in FIG. 3, the digital security system 102 utilizes a loss function 310 to compare the predicted take-over scores 308 and the ground truth historical account take-overs 312 (e.g. to determine an error or measure of loss between them). For instance, where the digital security machine-learning model 306 is an ensemble of gradient boosted decision trees, the digital security system 102 can utilize a mean squared error loss function (e.g., for regression) and/or a logarithmic loss function (e.g., for classification) as the loss function 310.

Moreover, in embodiments where the digital security machine-learning model 306 is a neural network, the digital security system 102 can utilize a cross-entropy loss function, an L1 loss function, or a mean squared error loss function as the loss function 310. For example, the digital security system 102 can utilize the loss function 310 to determine a difference between the predicted take-over scores 308 and the ground truth historical take-overs 312.

As further illustrated in FIG. 3, the digital security system 102 performs model fitting 314. In particular, the digital security system 102 fits the digital security machine-learning model 306 based on the loss from the loss function 310. For instance, the digital security system 102 performs modifications or adjustments to the digital security machine-learning model 306 to reduce the measure of loss from the loss function 310 for a subsequent training iteration.

For gradient boosted trees, for example, the digital security system 102 trains the digital security machine-learning model on the gradients of errors determined by the loss function 310. For instance, the digital security system 102 solves a convex optimization problem (e.g., of infinite dimensions) while regularizing the objective to avoid overfitting. In certain implementations, the digital security system 102 scales the gradients to emphasize correction to under-represented classes.

In some embodiments, the digital security system 102 adds a new weak learner (e.g., a new boosted tree) to the digital security machine-learning model 306 for each successive training iteration as part of solving the optimization problem. For example, the digital security system 102 finds a feature that minimizes a loss from the loss function 310 and either adds the feature to the current iteration's tree or start to build a new tree with the feature.

In addition to, or in the alternative, gradient boosted decision trees, the digital security system 102 trains a logistic regression to learn parameters for generating one or more predicted take-over scores 308. To avoid overfitting, the digital security system 102 further regularizes based on hyperparameters such as the learning rate, stochastic gradient boosting, the number of trees, the tree-depth(s), complexity penalization, and L1/L2 regularization In embodiments where the digital security machine-learning model 306 is a neural network, the digital security system 102 performs the model fitting 314 by modifying internal parameters (e.g., weights) of the digital security machine-learning model 306 to reduce the measure of loss for the loss function 310. Indeed, the digital security system 102 modifies how the digital security machine-learning model 306 analyzes and passes data between layers and neurons by modifying the internal network parameters. Thus, over multiple iterations, the digital security system 102 improves the accuracy of the digital security machine-learning model 306.

Indeed, in some cases the digital security system 102 repeats the training process illustrated in FIG. 3 for multiple iterations. For example, the digital security system 102 repeats the iterative training by selecting a new set of historical features for each feature along with a corresponding ground truth historical account take-over. As described above, digital security system 102 also compares take-over scores at each iteration with the corresponding ground truth historical account take-overs and further performs model fitting 314. The digital security system 102 repeats this process until the digital security machine-learning model 306 generates predicted take-over scores 308 that result in take-over scores that satisfy a threshold measure of loss.

In this manner, the digital security system 102 can tune, learn, or train parameters of the digital security machine-learning model 306. In some embodiments, the digital security system 102 can iteratively perform a training process (e.g., with multiple training batches). Indeed, the digital security system 102 can train for a certain number of iterations or until converging to a particular solution (e.g., with a limited threshold change in parameters).

Figure 4:
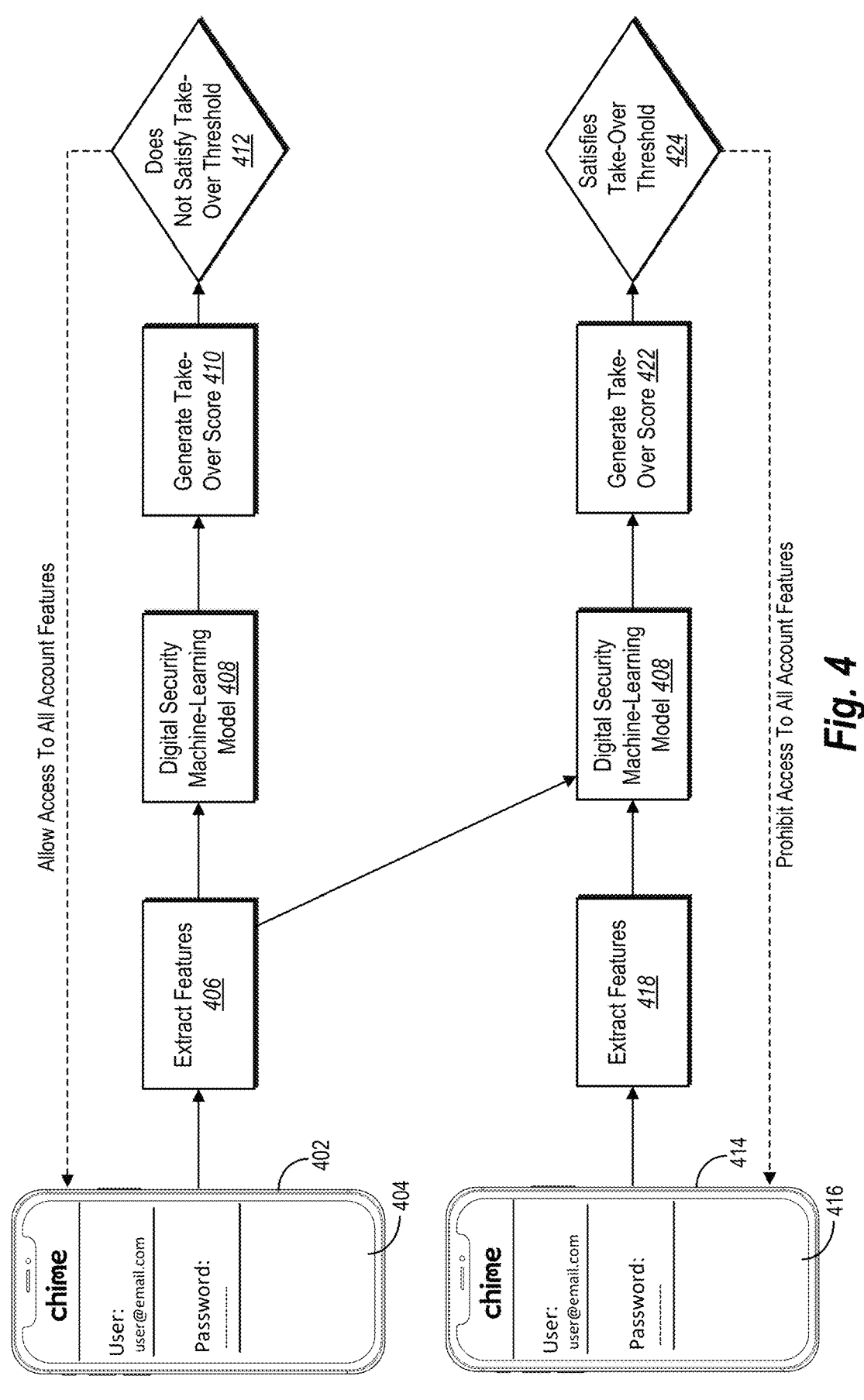
FIG. 4 illustrates an example diagram for a digital security system extracting features from multiple client devices in accordance with one or more embodiments.

In some embodiments, the digital security system 102 can detect when multiple devices request to access a secure digital account and generate a take-over score for each request. FIG. 4 illustrates the digital security system 102 extracting features from the client devices associated with each request to access a secure digital account and generating a take-over score for each request based on the extracted features from the corresponding client devices.

As shown in FIG. 4, the digital security system 102 receives login credentials via an accessing client device 402. In some embodiments, the digital security system 102 receives login credentials via the accessing client device 402 through a client application 404. For example, the digital security system 102 can receive login credentials by receiving a username and password associated with a user account in the inter-network facilitation system 104. In addition, the digital security system 102 can receive additional credentials, such as a two-factor or multi-factor authentication factor credentials. In other embodiments, the digital security system 102 can receive login credentials via a one-time use hyperlink or other one-time use login system.

As further shown in FIG. 4, the digital security system 102 can perform the act 406 of extracting features corresponding to the accessing client device 402. For example the extracted features could belong to one or more feature groups, such as features categorized as (i) number of accounts and sessions accessed from the same device in a previous amount of time (e.g., the previous day, 7 days, or 30 days), (ii) a number of accounts and sessions accessed from the same IP address in a previous amount of time (e.g., the previous day, 7 days, or 30 days), (iii) personal identifiable information (PII) changes, (iv) context data compared to prior sessions, or (v) failed logins from an IP address. The extracted features could also be one or more individual features, such as (i) a device user count feature, (ii) an IP lag distance feature, (iii) a device user count difference over a period of time feature, (iv) an IP distance over a period of time feature, (v) a device session count in a period of time feature, (vi) a time zone feature, (vii) a context network Wi-Fi feature, or (viii) a phone change count feature.

The digital security system 102 can also utilize the features described in the previous paragraph and other features described herein (e.g., the features describe with regard to FIG. 3). For example, the digital security system 102 can determine the number of accounts and sessions accessed from the same device, IP address, device ID, operating system, device type, or network over the previous one, seven, and/or thirty days. Similarly, the digital security system 102 can determine changes in personal identifiable information (e.g., indicating that a fraudster has accessed and changed contact information), context data compared to prior sessions (1 hour, 1 day, or 1 week before), and failed logins from IP addresses. In some embodiments, the digital security system 102 utilizes the number of historical devices used by a particular user and/or the age of the user's account (e.g., the time since enrollment).

As mentioned above, the digital security system 102 can determine historical features of accessing devices and compare those historical features with features of a current device (e.g., to generate device comparison features). The digital security system 102 can determine differences in counts for various features described herein (e.g., IP address, device ID, and other features) over various time windows. In some embodiments, the digital security system 102 utilizes real-time features (e.g., 1-5 minutes) in extracting and analyzing features. Thus, if a fraudulent device accesses an account, the digital security system 102 can compare up-to-date features relative to an accessing device that accessed the account seconds or minutes earlier.

The digital security system 102 can also extract features by determining features of accessing client device 402 at the time of the request to access a secure digital account. In some embodiments, the digital security system 102 extracts features by determining device characteristics of the accessing client device 402, such as the operating system of the client device (e.g., iOS or Android), the model of the client device (e.g., Samsung or iPhone), the model version of the client device, a name of the client device, or the time zone of the client device. In other embodiments, the digital security system 102 extracts features by determining an IP address of the accessing client device 402. In other instances, the digital security system 102 extracts features by determining account features by determining information about the secure digital account, such as name, login credentials, or location. Furthermore, in some embodiments, the digital security system extracts features by determining a device ID of the accessing client device 402.

As shown in FIG. 4, the digital security system 102 performs the act 408 of utilizing a digital security machine-learning model to analyze the extracted features. In some cases the digital security machine-learning model is a series of gradient boosted trees (e.g., CatBoost) that process the features to generate a take-over score. For instance, the digital security machine-learning model includes a series of weak learners, such as non-linear decision trees, that are trained in a logistic regression to generate the take-over score. For example, the digital security machine-learning model generates the take-over score as a take-over classification with a corresponding probability that the request to access a secure digital account is an account take-over event and/or a non-take-over classification with a corresponding probability that the request to access a secure digital account is not an account take-over event.

In some cases, the digital security machine-learning model is an ensemble of gradient boosted trees that process features to generate a take-over score. In some cases, the digital security machine-learning model includes metrics within various trees that define how the digital security machine-learning model processes the features to generate the take-over score.

In certain embodiments, the digital security machine-learning model is a different type of machine-learning model, such as a neural network, a support vector machine, or a random forest. For example, in cases where the digital security machine-learning model is a neural network, the digital security machine-learning model includes one or more layers with learned parameters for analyzing/processing input feature and/or latent feature vectors from previous layers. In some cases, the digital security machine-learning model generates the take-over score by extracting latent vectors from the features, passing the latent vectors from layer to layer (or neuron to neuron) to manipulate the vectors until utilizing an output layer (e.g., one or more fully connected layers) to generate the take-over score.

As further illustrated in FIG. 4, the digital security system 102 performs an act 410 of generating a take-over score. Specifically, the digital security system utilizes the digital security machine-learning model to generate a take-over score indicating a likelihood that a request to access a secure digital account is unauthorized activity (e.g., there is a risk the request is an account take-over event). In some embodiments, a take-over score can comprise a numerical score (e.g., a number, a fraction, or other numerical indicators) indicating a degree to which a digital security machine-learning model predicts a request to access a secure digital account is an account take-over event. In other embodiments, the take-over score could be a classifier (e.g., a binary classification, such as a "0" or a "1") indicating a prediction that the request to access a secure digital account is an account take-over event.

Furthermore, as illustrated in FIG. 4, the digital security system 102 performs an act 412 of determining if the take-over score satisfies a take-over threshold. Indeed, the digital security system can determine the take-over score satisfies a take-over threshold by determining if the take-over score is at or above a certain numerical threshold (e.g., above 0.65) or if a decision tree answers "yes" to questions regarding whether there is a risk that the request to access a secure digital account is an account take-over event. As shown, the digital security system 102 determines that the take-over score does not satisfy a take-over threshold.

In some embodiments, when a take-over score does not satisfy a take-over threshold, the digital security system 102 allows access to all account features. Indeed, the digital security system 102 allows the client device to access sensitive account features. In some embodiments, the digital security system allows the client device to access sensitive account features by allowing access to a virtual card feature on the account. In other embodiments, the digital security system allows access to all features by allowing access to a digital account feature. For example, a digital account feature could include a transfer feature, where the client device can transfer money to an outside account (e.g., a peer-to-peer transaction).

As indicated above, the digital security system 102 can prohibit access to a subset of account features in some instances. Moreover, in making such a determination, the digital security system 102 can analyze features from previous account requests (e.g., features extracted at the act 406). As illustrated in FIG. 4, the digital security system 102 can receive login credentials via an accessing client device 414. For example, the digital security system 102 can receive login credentials through a client application 416 on the accessing device 414.

As further illustrated in FIG. 4, the digital security system 102 can perform an act 418 and extract features of accessing client device 414. For example, the digital security machine-learning model can extract features including feature groups or individual features as described above. Indeed, the digital security system 102 can extract features of accessing client device 414 by extracting one or more of features or feature groups as extracted from accessing client device 402.

As also illustrated in FIG. 4, the digital security system 102 performs an act 420 and utilizes the digital security machine-learning model 408 to analyze the features extracted from accessing client device 414 (e.g., in the act 418). As illustrated, the digital security system 102 also analyzes the features extracted from accessing client device 402 (e.g., in the act 406). In some embodiments, the digital security machine-learning model compares the extracted features from accessing client device 414 and the historical features corresponding to the accessing client device 402 to analyze whether the request to access the secure digital account is an account take-over event.

For example, as discussed above in relation to the act 406, the digital security system 102 can determine an IP address utilized by the accessing client device 402. The digital security system 102 can access this original IP address and also determine a new IP address corresponding to the accessing client device 414. The digital security system 102 can compare the original IP address (corresponding to the accessing client device 402) and the new IP address (corresponding to the accessing client device 414) to generate a new/derived feature. For example, the digital security system 102 can determine a derived feature of IP address distance by determining the distance between a first location associated with the original IP address and a second location associated with the new IP address. As discussed previously, the digital security system 102 can compare a variety of different features (e.g., time zone, device ID, operating system, device type, cellular network, Wi-Fi network, location) over a variety of different time periods. Thus, as illustrate, the digital security system 102 can compare the features from the act 406 and features extracted from the act 418 to generate new/derived features for the digital security machine-learning model 408.

Further illustrated in FIG. 4, the digital security system 102 performs an act 422 by generating a take-over score. Indeed, the digital security system 102 utilizes a digital security machine-learning model to generate a take-over score based on the features extracted from accessing client device 414 and accessing client device 402.

As shown in FIG. 4, the digital security system 102 performs an act 424 of determining if the take-over score satisfies a take-over threshold. Indeed, the digital security system can determine the take-over score satisfies a take-over threshold by determining if the take-over score is at or above a certain numerical threshold (e.g., above 0.65) or if a decision tree answers "yes" to questions regarding whether there is a risk that the request to access a secure digital account is an account take-over event. As shown, the digital security system 102 determines that the take-over score satisfies a take-over threshold.

In some embodiments, when a take-over score satisfies a take-over threshold, the digital security system 102 can prohibit access to a subset of account features. Indeed, the digital security system 102 can allow access to the secure digital account but prohibit access to a subset of account features. In some embodiments, the digital security system 102 can allow the client device 414 to access the secure digital account by providing secure account information. For example, the digital security system 102 can provide secure account information by showing information associated with the account, such as transaction information.

In some instances, the digital security system 102 can prohibit access to a subset of account features by preventing access to a subset of account features. Indeed, the digital security system 102 can detect a request to access a subset of account features and prevent access to those features. For example, the digital security system can prohibit access to a virtual card feature or a digital account feature.

In one or more embodiments, the digital security system 102 can prohibit access to one or more account features while also providing avenues to reinstate the account features. For example, in some embodiments, the digital security system 102 excludes a client device from account features for a period of 24 hours unless a client device initiates an escalation procedure or step-up flow (e.g., provides additional credentials and/or contacts an agent to access the account). In some embodiments, the digital security system 102 provides a prompt or notification regarding the availability of the account features via the step-up flow.

As mentioned above, in certain embodiments, if a take-over score satisfies a take-over threshold, the digital security system 102 can allow a client device to access a secure digital account but prohibit access to a subset of account features. In particular, the digital security system 102 can allow access to a secure digital account by presenting secure account information in a graphical user interface on the client device and can prohibit access to a subset of account features by detecting a request to access the subset of account features and providing a visual indicator in the graphical user interface that the feature is not available. FIGS. 5A-E illustrate example graphical user interfaces for allowing access to a secure digital account but prohibiting access to a subset of account features when a take-over score satisfies a take-over threshold in accordance with one or more embodiments.

Figure 5B:
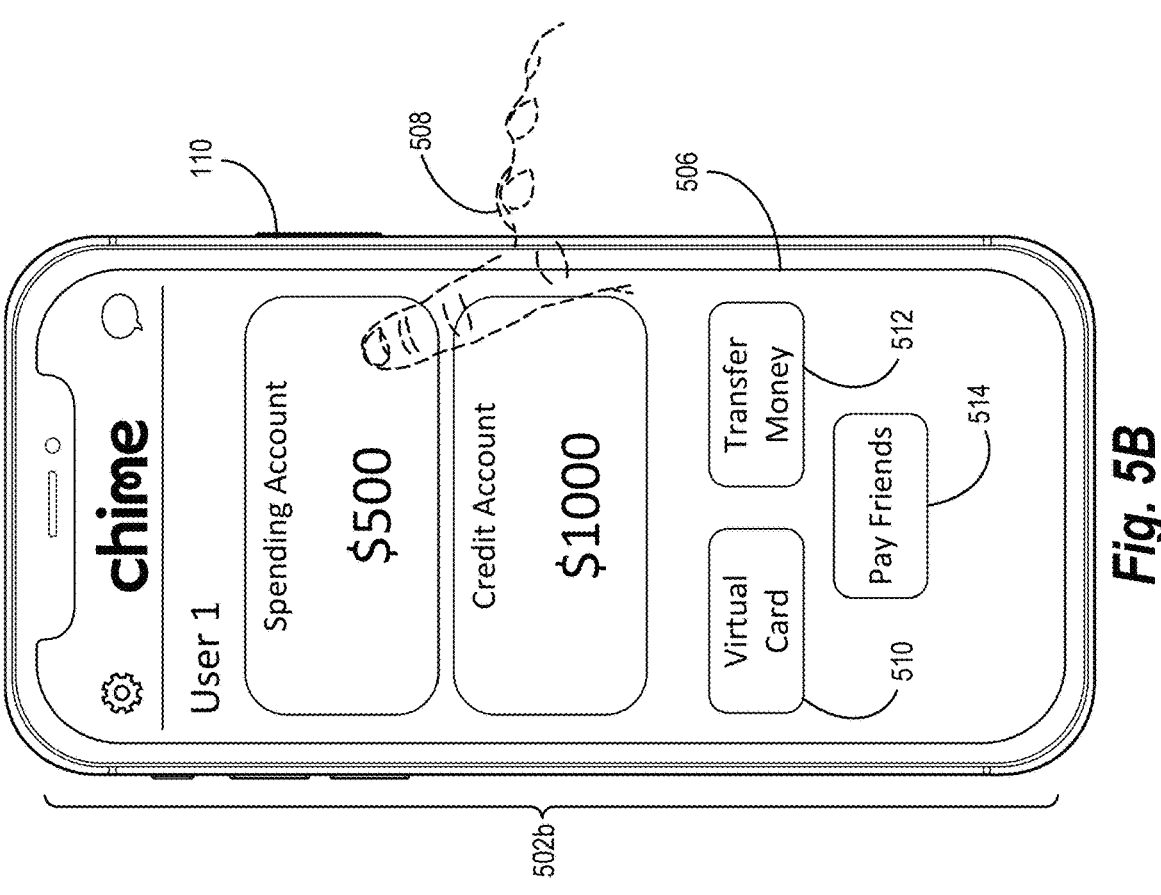
FIGS. 5A-5E illustrate example graphical user interfaces prohibiting access to a subset of account features in accordance with one or more embodiments.
Figure 5A:
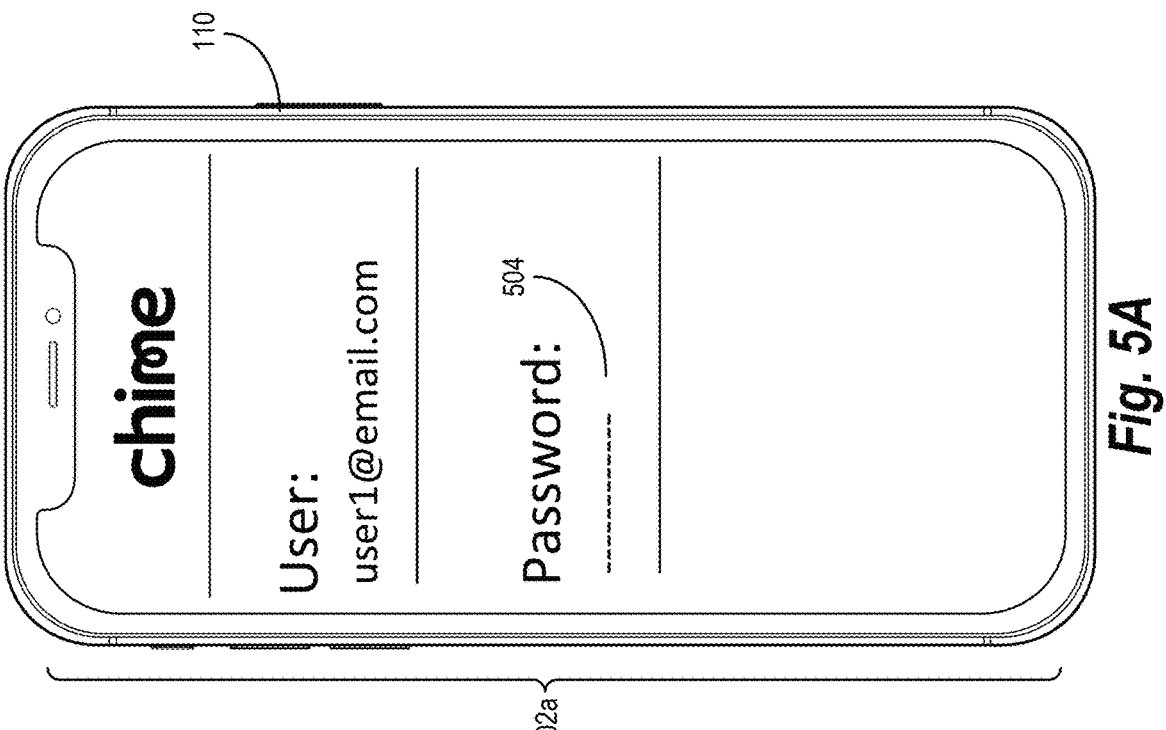

As illustrated in FIG. 5A, the digital security system 102 receives login credentials 504 via a graphical user interface 502a. As described above, the digital security system 102 can receive login credentials 504 by receiving a username and password associated with a user account in the inter-network facilitation system 104. In addition, the digital security system 102 can receive additional credentials, such as a two-factor or multi-factor authentication factor credentials. In some embodiments, the digital security system 102 can receive login credentials via a one-time use hyperlink or other one-time use login system.

As shown in FIG. 5B, the digital security system 102 can provide secure account information by providing account information via the graphical user interface 502*b*. Indeed, the digital security system 102 can display secure account information by displaying information but not allowing a client device to move money or change account credentials. For example, graphical user interface 502*b* provides secure account information, such as a spending account feature 506, a credit account feature 508, a virtual card feature 510, a transfer money feature 512, and a peer-to-peer feature 514 (e.g., a Pay Friends feature). In some embodiments, in response to a request to access additional secure account information, the graphical user interface can provide additional secure account information. As shown, the digital security system 102 receives a request to access spending account 506 by detecting a user interaction with graphical user interface 502*b*.

Figure 5D:
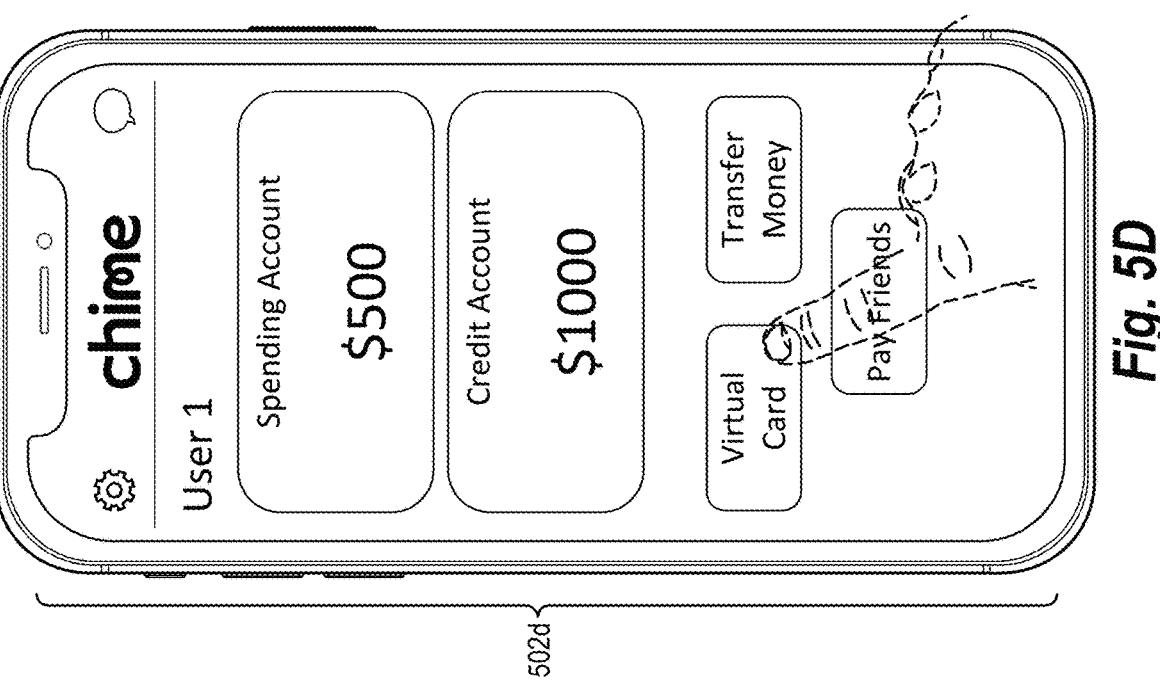
Figure 5C:
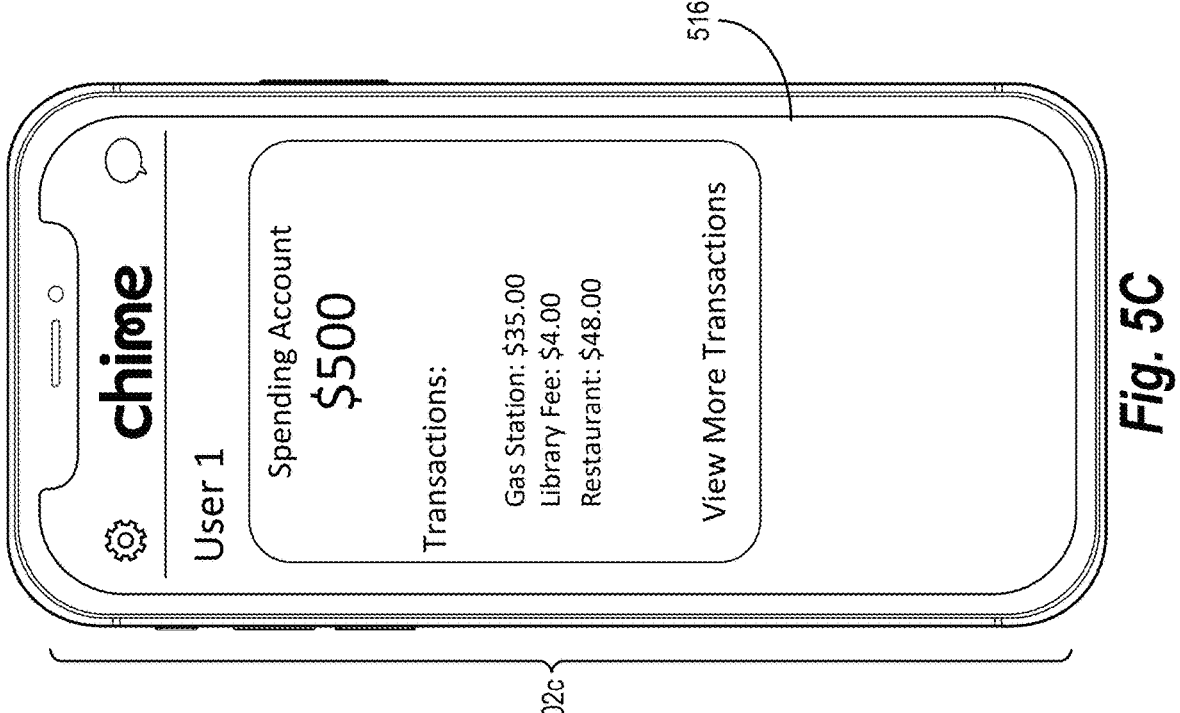

In some cases, as illustrated in FIG. 5C, in response to the request to access additional secure account information, the digital security system 102 can display the additional secure account information in the graphical user interface 502*c*. As shown, in response to the request to access the spending account feature 506, the digital security system 102 displays transactions, including an indication of a gas station transaction, a library fee transaction, and a restaurant transaction.

As mentioned above, by providing some account features (e.g., low-risk account features), the digital security system 102 can avoid system disruptions will still maintaining account security with regard to other features (e.g., high-risk account features). For example, providing a list of transactions to a potential fraudulent device is significantly less prejudicial than other features (such as allowing a transfer of digital assets). By providing some features and withholding others, the digital security system 102 reduces the most significant prejudice/harm to user accounts without introducing significant system disruptions to account accessibility.

As illustrated in FIG. 5D, the digital security system 102 can detect requests to access additional account features. As shown, the digital security system 102 receives a request to access virtual card feature 510 by detecting a user interaction with graphical user interface 502*d*.

Figure 5E:
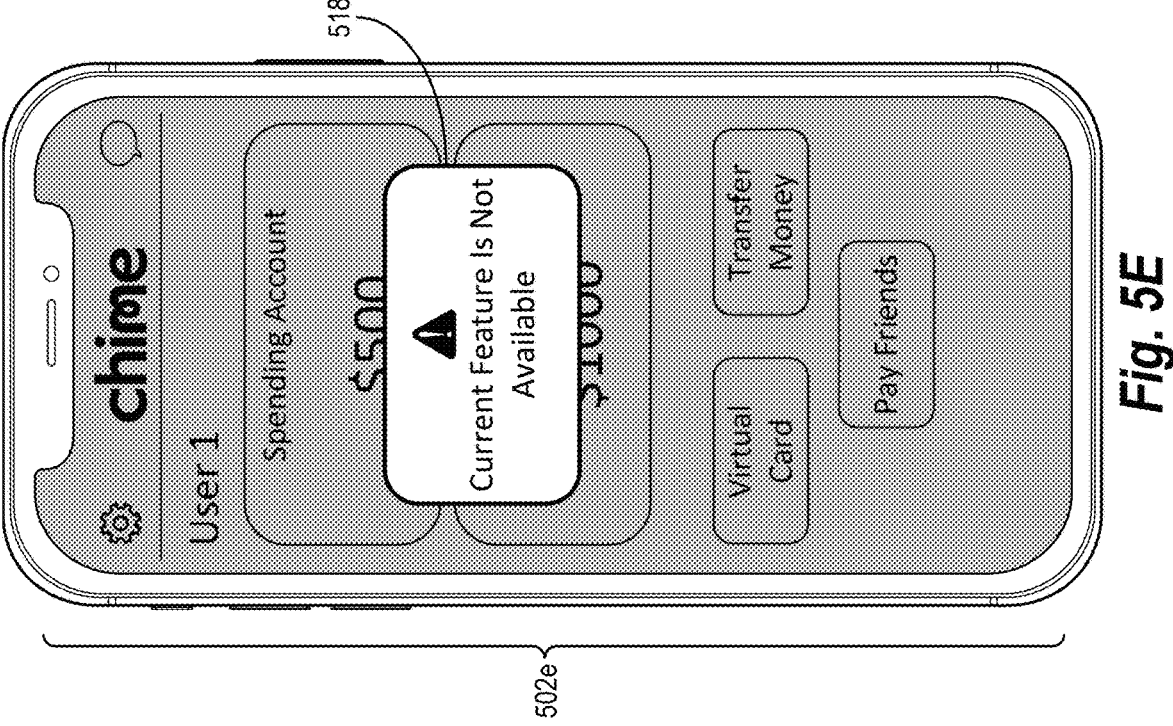

As shown in FIG. 5E, in response to access a subset of account features and when the take-over score satisfies a take-over threshold, the digital security system 102 can prohibit access to the subset of account features. In some embodiments, the digital security system 102 can prohibit access to the subset of account features by providing a visual indicator in a graphical user interface indicating that the subset of account features are not available. As shown, in response to the request to access the virtual card feature the digital security system 102 displays visual indicator 518 denoting that the feature cannot be accessed within graphical user interface 502*e*. In some instances, visual indicator 518 can be a text box stating that the current feature is not available. In other instances, visual indicator 518 can be denoted with an image or icon indicating that the current feature is not available.

Although FIGS. 5A-5E illustrate a particular series of user interfaces and interactions, the digital security system 102 can provide alternative interfaces (and in respond to a variety of different interactions). For example, although FIG. 5E illustrates the visual indicator 518 indicating that the current feature is not available, in some embodiments, the digital security system 102 withholds a client feature without providing a visual indicator. Indeed, the digital security system 102 can avoid alerting a fraudster that they have been discovered by withholding certain account features without providing a visual indicator. Thus, for example, the digital security system 102 can automatically exclude the virtual card feature 510, the transfer money feature 512, and the peer-to-peer feature 514 from the user interfaces of FIGS. 5B and 5D.

Although not illustrated in FIGS. 5A-5E, in some embodiments, the digital security system 102 can utilize multiple different thresholds corresponding to take-over scores. For example, the digital security system 102 can apply a first threshold corresponding to a first account feature (e.g., withhold the virtual card feature 510 if the take-over score satisfies the first threshold). The digital security system 102 can apply a second threshold corresponding to a second account feature (e.g., also withhold the transfer money feature 512 if the take-over score satisfies the second threshold). The digital security system 102 can apply a third threshold that prohibits access to the entire user account (e.g., if the take-over score is above 95% the digital security system 102 locks down the account and prohibits any access). The digital security system 102 can also apply a fourth threshold that requires initiation of a step-up flow or procedure to access certain account features. Accordingly, the digital security system 102 can utilize the take-over score and a variety of thresholds to perform different functions.

For example, with regard to a step-up flow, the digital security system 102 can apply a threshold that, when satisfied, initiates an identification verification workflow. For example, upon detecting a take-over score that satisfies the step-up threshold, the digital security system 102 redirects the client device to a verification user interface and corresponding workflow process. The digital security system 102 can request a client device to provide an identifier (e.g., a facial scan identifier, an identification card, and/or an identifying password or code). In some embodiments, the digital security system 102 can require a particular digital image (e.g., a digital image of a person's face associated with the account) before granting access to any features of the account.

The digital security system 102 can apply this step-up workflow intelligently to particular client devices. For example, the digital security system 102 can initiate an identification verification workflow for a first client device (where the take-over score satisfies a step-up threshold). However, the digital security system 102 can allow access to one or more account features to a second client device (e.g., where the take-over score does not satisfy a step-up threshold). Thus, the digital security system 102 can maintain efficient, low friction, user interfaces for trusted devices held by the actual account owner.

The digital security system 102 can also determine and apply take-over scores at different times or stages. For example, in some embodiments, the digital security system 102 determines take-over scores (and identifies what features to withhold) at the time that a client device first accesses (or requests to access) a digital account. In some embodiments, the digital security system 102 determines take-over scores (and identifies what features to withhold) at the time that a client device seeks to access particular account features. For example, the digital security system 102 determines take-over scores in response to a user selecting the virtual card feature 510 (or some other feature, like changing personal identifiable information, initiating a transaction, viewing account information, etc.).

Moreover, in some embodiments, the digital security system 102 prohibits access to account features (and/or determines take-over scores) in response to verifying the login credentials for accessing the secure digital account. Indeed, because account take-overs usually occur when a fraudulent device gains access to login credentials, in some embodiments, the digital security system first verifies the login credentials before expending computer resources to determine take-over scores and/or withhold account features.

The digital security system 102 can also utilize account take-over scores in supporting other protocols or operations. For example, the digital security system 102 can determine account take-over scores for other risk assessment, fraud, or prediction models. To illustrate, the digital security system 102 can utilize the account take-over score as input to an additional model that determines whether a user account has committed fraud (e.g., whether a user has tried to deny that a legitimate transaction was initiated by the user).

Similarly, upon identifying an account take-over (i.e., an account take-over score above a particular threshold), the digital security system 102 can monitor and utilize digital information regarding the account take-over. For example, the digital security system 102 can provide digital information to an enforcement mechanism or algorithm (e.g., to determine the identity of the fraudulent device). The digital security system 102 can also monitor and utilize this information for further training a digital security machine-learning model.

Figure 6:
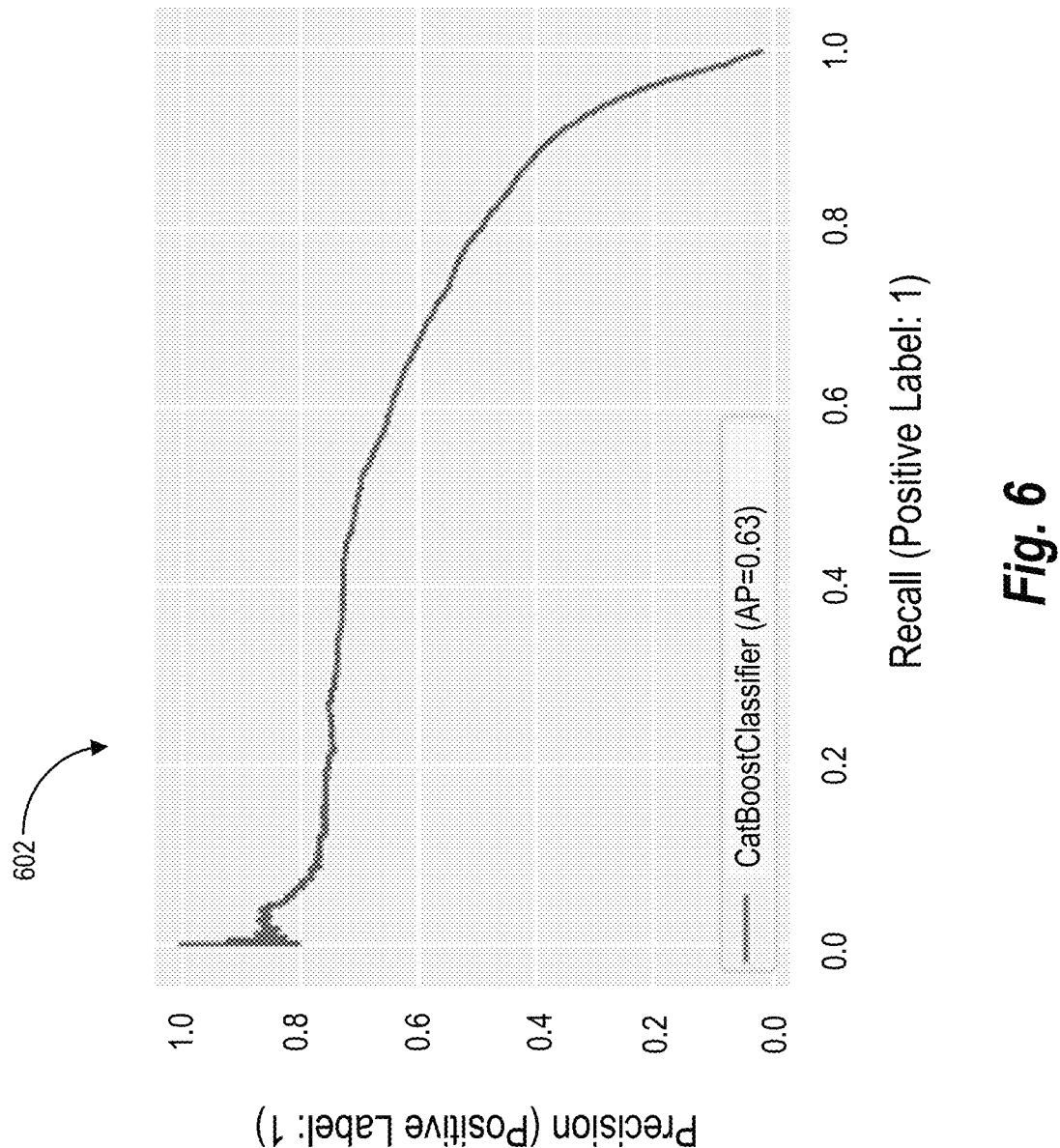
FIG. 6 illustrates a graph depicting the precision and recall of the digital security system in accordance with one or more embodiments.

As mentioned above, the digital security system 102 improves in accurately identifying whether a client device is associated with a secure digital account. FIG. 6 illustrates a graph depicting the accuracy of the digital security machine-learning model in accordance with one or more embodiments.

As illustrated in FIG. 6, graph 602 includes a binary precision-recall curve that depicts precision over recall. In the graph 602, precision represents the number of true-positive account take-overs divided by the sum of true-positive account take-overs and false-positive account take-overs. By contrast, recall represents the number of true-positive account take-overs divided by the sum of true-positive account take-overs and false-negative account take-overs. As shown, the digital security system 102 utilizing the digital security machine-learning model obtains roughly seventy-five percent precision and 40 percent recall.

Figure 7:
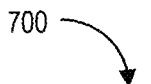
FIG. 7 illustrates an example series of acts for utilizing a digital security machine-learning model to generate a take-over score and prohibit access to a subset of account features in accordance with one or more embodiments.
Figure 7:
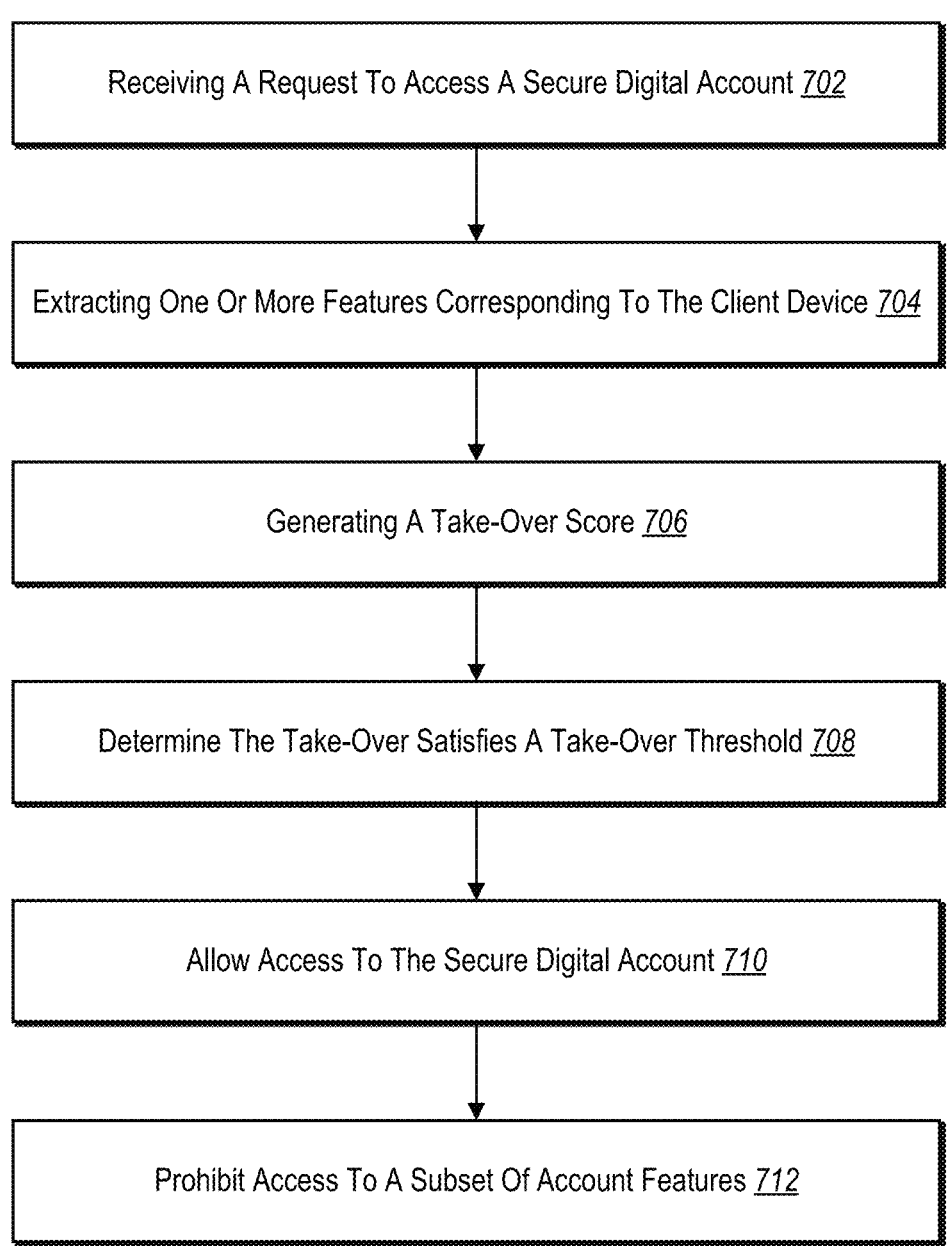

FIG. 7, the corresponding text, and the examples provide a number of different methods, systems, devices, and non-transitory computer-readable media of the digital security system 102. In addition to the foregoing, one or more embodiments can also be described in terms of flowcharts comprising acts for accomplishing a particular result, as shown in FIG. 7. FIG. 7 may be performed with more or fewer acts. Further, the acts may be performed in differing orders. Additionally, the acts described herein may be repeated or performed in parallel with one another or parallel with different instances of the same or similar acts.

As mentioned, FIG. 7 illustrates a flowchart of a series of acts 700 for a digital security system 102 in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7.

FIG. 7 illustrates an example series of acts 700 for utilizing a digital security machine-learning model to determine a take-over score corresponding to client device and utilizing the take-over score to intelligently provide (or limit) access to account features. As shown in FIG. 7, the series of acts 700 can include an act 702 of receiving a request to access a secure digital claim.

Further, the series of acts 700 includes an act 704 of extracting features corresponding to a client device. In particular, the act 704 can involve extracting one or more features corresponding to a client device associated with a request to access a secure digital account.

In addition, as illustrated in FIG. 7, the series of acts 700 includes an act 706 of generating a take-over score. In particular, the act 706 involves generating, utilizing a digital security machine-learning model, a take-over score based on one or more features associated with a client device.

Moreover, the series of acts 700 includes an act 708 of determining that the take-over score satisfies a take-over threshold.

Furthermore, the series of acts 700 includes an act 710 of allowing access to the secure digital account. In particular, the act 710 involves allowing access to a secure digital account by providing secure account information for display via a client device.

Furthermore, the series of acts 700 includes an act 712 of prohibiting access to a subset of account features. In particular, the series of acts 700 involves prohibiting access to a subset of account features in response to a request to access the subset of account features.

In some embodiments, the series of acts 700 includes an act of determining one or more historical features of an accessing client device associated with the secure digital account, comparing the one or more historical features of the accessing client device with the one or more features corresponding to the client device to determine one or more device comparison features, and generating, utilizing the digital security machine-learning model, the take-over score from the one or more device comparison features.

Furthermore, the series of acts 700 includes an act of extracting the one or more features by determining an IP address corresponding to the client device, determining the one or more historical features by determining a historical IP address of the accessing client device, and comparing the one or more historical features of the accessing client device with the one or more features corresponding to the client device by determining a distance between the IP address and the historical IP address.

In some cases, the series of acts 700 includes an act of utilizing the digital security machine-learning model to generate the take-over score by utilizing a gradient boosted decision tree to generate the take-over score from the one or more features associated with the request.

In other embodiments, the series of acts 700 includes an act of extracting the one or more features by extracting one or more of: a number of accounts accessed by the client device or a number of failed logins from an IP address.

In some embodiments, the series of acts 700 includes prohibiting access to the subset of account features by prohibiting access to a digital account feature or a virtual card feature.

Moreover, the series of acts 700 includes receiving the request to access the secure digital account by receiving login credentials for the secure digital account via the client device and, upon verifying the login credentials for accessing the secure digital account, prohibiting the access to the subset of account features based on determining that the take-over score satisfies the take-over threshold.

Furthermore, the series of acts 700 includes identifying ground truth historical account take-overs by monitoring historical interactions of a set of client devices and filtering interactions based on client device inconsistencies and a time threshold for client interaction with a subset of account features.

In other embodiments, the series of acts 700 includes training the digital security machine-learning model by extracting historical features of a set of client devices corresponding to the ground truth historical account take-overs, utilizing the historical features of the set of client devices to generate a plurality of predicted take-over scores and comparing the plurality of predicted take-over scores to the ground truth historical account take-overs.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 8:
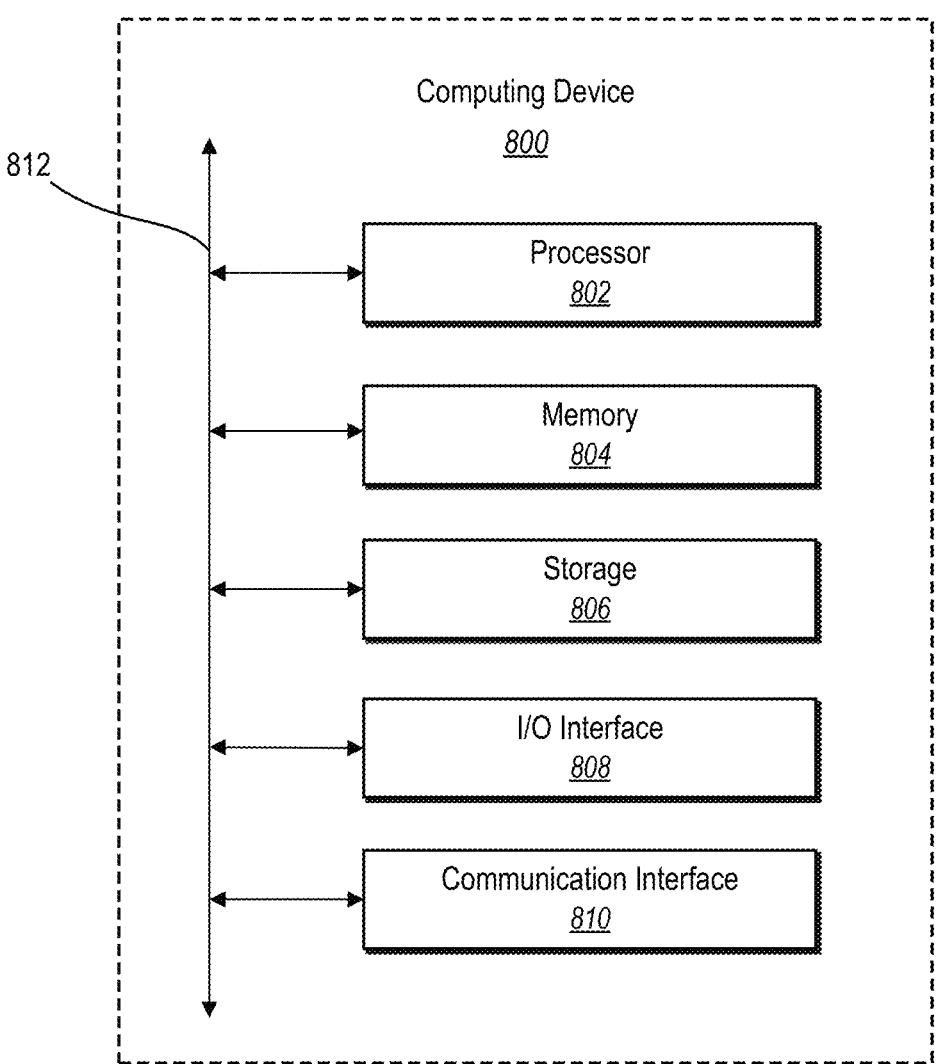
FIG. 8 illustrates a block diagram of a computing device for implementing one or more embodiments of the present disclosure.

FIG. 8 illustrates a block diagram of an example computing device 800 that may be configured to perform one or more of the processes described above. One will appreciate that one or more computing devices, such as the computing device 800 may represent the computing devices described above (e.g., the server(s) 106, the client device 112*a*, and the network 118). In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of computing device 800 to each other.

Figure 9:
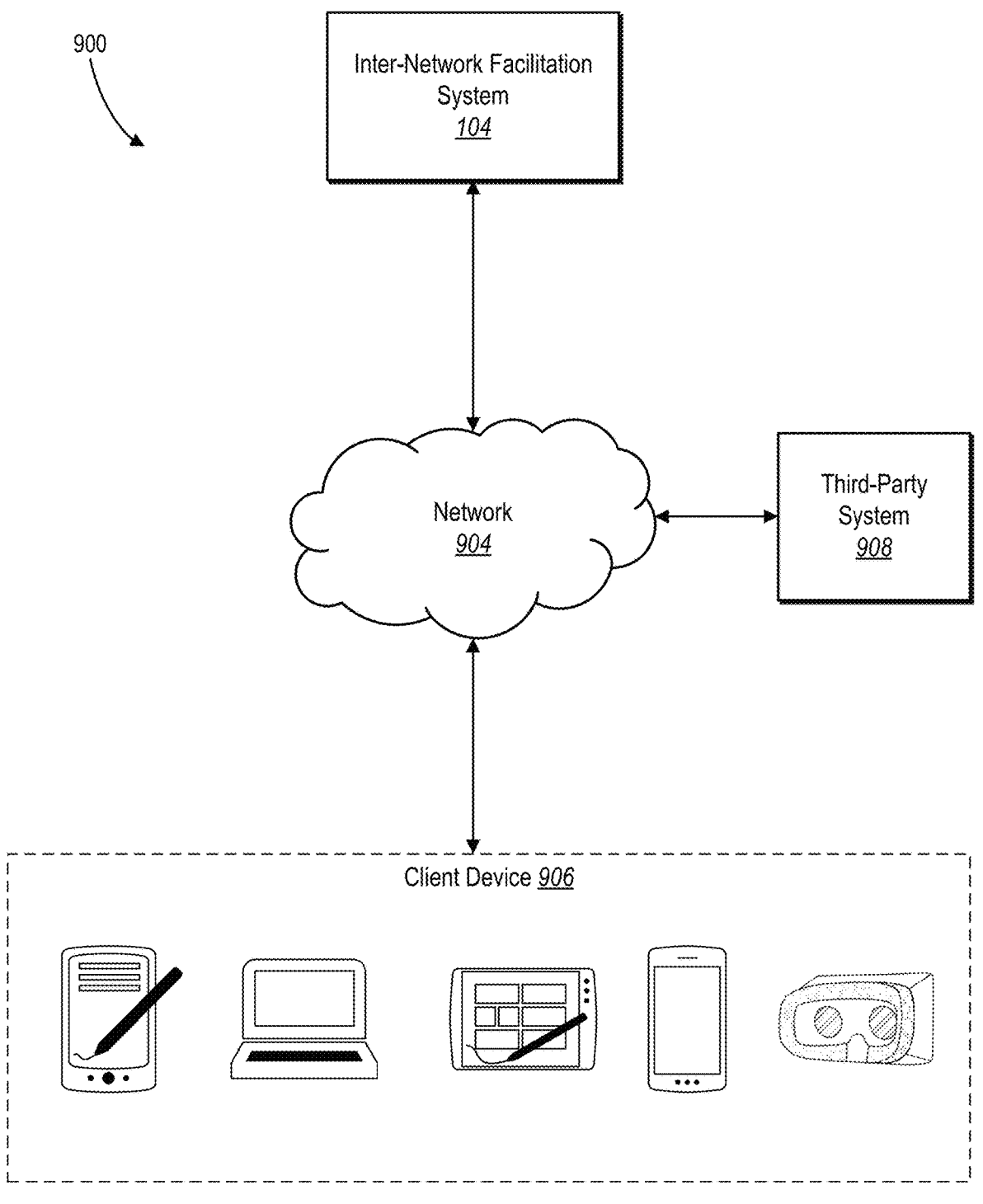
FIG. 9 illustrates an example environment for an inter-network facilitation system in accordance with one or more embodiments.

FIG. 9 illustrates an example network environment 900 of the inter-network facilitation system 104. The network environment 900 includes a client device 906 (e.g., client device 110*a*-110*n*), an inter-network facilitation system 104, and a third-party system 908 connected to each other by a network 904. Although FIG. 9 illustrates a particular arrangement of the client device 906, the inter-network facilitation system 104, the third-party system 908, and the network 904, this disclosure contemplates any suitable arrangement of client device 906, the inter-network facilitation system 104, the third-party system 908, and the network 904. As an example, and not by way of limitation, two or more of client device 906, the inter-network facilitation system 104, and the third-party system 908 communicate directly, bypassing network 904. As another example, two or more of client device 906, the inter-network facilitation system 104, and the third-party system 908 may be physically or logically co-located with each other in whole or in part.

Moreover, although FIG. 9 illustrates a particular number of client devices 906, inter-network facilitation systems 104, third-party systems 908, and networks 904, this disclosure contemplates any suitable number of client devices 906, inter-network facilitation system 104, third-party systems 908, and networks 904. As an example, and not by way of limitation, network environment 900 may include multiple client device 906, inter-network facilitation system 104, third-party systems 908, and/or networks 904.

This disclosure contemplates any suitable network 904. As an example, and not by way of limitation, one or more portions of network 904 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 904 may include one or more networks 904.

Links may connect client device 906, digital security system 102, and third-party system 908 to network 904 or to each other. This disclosure contemplates any suitable links.

In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, the client device 906 may be an electronic device including hardware, software, or embedded logic components or a combination of two or more such components and capable of carrying out the appropriate functionalities implemented or supported by client device 906. As an example, and not by way of limitation, a client device 906 may include any of the computing devices discussed above in relation to FIG. 11. A client device 906 may enable a network user at the client device 906 to access network 904. A client device 906 may enable its user to communicate with other users at other client devices 906.

In particular embodiments, the client device 906 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 906 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 906 one or more Hyper Text Markup Language ("HTML") files responsive to the HTTP request. The client device 906 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 904) to link the third-party-system 1208. For example, the inter-network facilitation system 104 may receive authentication credentials from a user to link a third-party system 908 such as an online bank account, credit account, debit account, or other financial account to a user account within the inter-network facilitation system 104. The inter-network facilitation system 104 can subsequently communicate with the third-party system 908 to detect or identify balances, transactions, withdrawal, transfers, deposits, credits, debits, or other transaction types associated with the third-party system 908. The inter-network facilitation system 104 can further provide the aforementioned or other financial information associated with the third-party system 908 for display via the client device 906. In some cases, the inter-network facilitation system 104 links more than one third-party system 908, receiving account information for accounts associated with each respective third-party system 908 and performing operations or transactions between the different systems via authorized network connections.

In particular embodiments, the inter-network facilitation system 104 may interface between an online banking system and a credit processing system via the network 904. For example, the inter-network facilitation system 104 can provide access to a bank account of a third-party system 908 and linked to a user account within the inter-network facilitation system 104. Indeed, the inter-network facilitation system 104 can facilitate access to, and transactions to and from, the bank account of the third-party system 908 via a client application of the inter-network facilitation system 104 on the client device 906. The inter-network facilitation system 104 can also communicate with a credit processing system, an ATM system, and/or other financial systems (e.g., via the network 904) to authorize and process credit charges to a credit account, perform ATM transactions, perform transfers (or other transactions) across accounts of different third-party systems 908, and to present corresponding information via the client device 906.

In particular embodiments, the inter-network facilitation system 104 includes a model for approving or denying transactions. For example, the inter-network facilitation system 104 includes a transaction approval machine-learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 908), the inter-network facilitation system 104 can utilize the transaction approval machine-learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 900 either directly or via network 904. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 906, or an inter-network facilitation system 104 to manage, retrieve, modify, add, or delete, the information stored in data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 904.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles for transportation providers and/or transportation requesters. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 906. An action logger may be used to receive communications from a web server about a user's actions on or off the inter-network facilitation system 104. In conjunction with the action log, a third-party-content-object log may be maintained of user exposures to third-partycontent objects. A notification controller may provide information regarding content objects to a client device 906. Information may be pushed to a client device 906 as notifications, or information may be pulled from client device 906 responsive to a request received from client device 906. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 906 associated with users.

In addition, the third-party system 908 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 904. A third-party system 908 can communicate with the inter-network facilitation system 104 to provide financial information pertaining to balances, transactions, and other information, whereupon the inter-network facilitation system 104 can provide corresponding information for display via the client device 906. In particular embodiments, a third-party system 908 communicates with the inter-network facilitation system 104 to update account balances, transaction histories, credit usage, and other internal information of the inter-network facilitation system 104 and/or the third-party system 908 based on user interaction with the inter-network facilitation system 104 (e.g., via the client device 906). Indeed, the inter-network facilitation system 104 can synchronize information across one or more third-party systems 908 to reflect accurate account information (e.g., balances, transactions, etc.) across one or more networked systems, including instances where a transaction (e.g., a transfer) from one third-party system 908 affects another third-party system 908.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

Each of the components of the digital security system 102 can include software, hardware, or both. For example, the components of the digital security system 102 can include one or more instructions stored on a computer-readable storage medium and executable by processors of one or more computing devices, such as a client device or server device. When executed by the one or more processors, the computer-executable instructions of the digital security system 102 can cause the computing device(s) to perform the methods described herein. Alternatively, the components of the digital security system 102 can include hardware, such as a special-purpose processing device to perform a certain function or group of functions. Alternatively, the components of the digital security system 102 can include a combination of computer-executable instructions and hardware.

Furthermore, the components of the digital security system 102 performing the functions described herein may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the digital security system 102 may be implemented as a stand-alone application, such as a desktop or mobile application. Furthermore, the components of digital security system 102 may be implemented as one or more web-based applications hosted on a remote server. The components of the digital security system 102 may also be implemented in a suite of mobile device applications or "apps."

What is claimed is:

1. A computer-implemented method comprising:
receiving, via a client device, a request to access a secure digital account;
determining one or more extracted features associated with the client device;
generating, utilizing a digital security machine-learning model, a take-over score based on the one or more extracted features;
upon determining that the take-over score satisfies a take-over threshold, allowing access to the secure digital account by providing, for display via the client device, a first selectable option for a first feature, and a second selectable option for a second feature;
in response to receiving, from the client device, a first selection of the first selectable option, executing the first feature based on the take-over score and based on the first feature being a first type;
in response to receiving, from the client device, a second selection of the second selectable option, prohibiting execution of the second feature based on the take-over score and the second feature being a second type; and
providing, on the client device, a notification that the second feature is unavailable.

2. The computer-implemented method of claim 1, wherein determining the one or more extracted features associated with the client device comprises:
identifying an IP address associated with the client device; and
determining a time zone associated with a location corresponding to the IP address.

3. The computer-implemented method of claim 1, wherein determining the one or more extracted features associated with the client device comprises:
determining a number of secure accounts the client device attempted to access; or determining a number of failed logins from an IP address associated with the client device.

4. The computer-implemented method of claim 1, wherein:
the first feature is a balance inquiry feature, and executing the first feature based on the take-over score comprises providing an account balance for display on the client device; and
the second feature is a transfer feature, and prohibiting executing of the second feature based on the take-over score comprises prohibiting the client device from accessing the transfer feature.

5. The computer-implemented method of claim 1, further comprising:
identifying a first threshold based on the first feature being the first type, and wherein executing the first feature based on the take-over score comprises comparing the take-over score to the first threshold; and
identifying a second threshold based on the second feature being the second type, and wherein prohibiting executing of the second feature based on the take-over score comprises comparing the take-over score to the second threshold.

6. The computer-implemented method of claim 1, further comprising:
determining one or more historical client device features associated with the secure digital account;
determining one or more device comparison features by comparing the one or more historical client device features with the one or more extracted features associated with the client device; and
wherein the take-over score is based at least in part on the one or more device comparison features.

7. The computer-implemented method of claim 6, wherein:
at least one historical client device feature comprises a historical IP address associated with the secure digital account:
at least one extracted feature associated with the client device comprises a current IP address associated with the client device; and
at least one device comparison feature comprises a distance between a first location associated with the historical IP address and a second location associated with the current IP address.

8. A non-transitory computer-readable medium storing instructions that, when executed by at least one processor, cause a computer system to:
receive, from a client device, a request to access a secure digital account;
determine one or more extracted features associated with the client device;
generate, utilizing a digital security machine-learning model, a take-over score based on the one or more extracted features;
upon determining that the take-over score satisfies a take-over threshold, allowing access to the secure digital account by providing, for display via the client device, a first selectable option for a first feature, and a second selectable option for a second feature;
in response to receiving, from the client device, a first selection of the first selectable option, execute the first feature based on the take-over score and based on the first feature being a first type;
in response to receiving, from the client device, a second selection of the second selectable option, prohibit execution of the second feature based on the take-over score and the second feature being a second type; and provide, on the client device, a notification that the second feature is unavailable.

9. The non-transitory computer-readable medium of claim 8, wherein determining the one or more extracted features associated with the client device comprises:

identifying an IP address associated with the client device; and determining a time zone associated with a location corresponding to the IP address.

10. The non-transitory computer-readable medium of claim 8, wherein determining the one or more extracted features associated with the client device comprises:

determining a number of secure accounts the client device attempted to access; or determining a number of failed logins from an IP address associated with the client device.

11. The non-transitory computer-readable medium of claim 8, wherein:

the first feature is a balance inquiry feature, and executing the first feature based on the take-over score comprises providing an account balance for display on the client device; and the second feature is a transfer feature, and prohibiting executing of the second feature based on the take-over score comprises prohibiting the client device from accessing the transfer feature.

12. The non-transitory computer-readable medium of claim 8, further comprising instructions that, when executed by the at least one processor, cause the computer system to:

identify a first threshold based on the first feature being the first type, and wherein executing the first feature based on the take-over score comprises comparing the take-over score to the first threshold; and identify a second threshold based on the second feature being the second type, and wherein prohibiting executing of the second feature based on the take-over score comprises comparing the take-over score to the second threshold.

13. The non-transitory computer-readable medium of claim 8, further comprising instructions that, when executed by the at least one processor, cause the computer system to:

determine one or more historical client device features associated with the secure digital account;

determine one or more device comparison features by comparing the one or more historical client device features with the one or more extracted features associated with the client device; and wherein the take-over score is based at least in part on the one or more device comparison features.

14. The non-transitory computer-readable medium of claim 13, wherein:

at least one historical client device feature comprises a historical IP address associated with the secure digital account:

at least one extracted feature associated with the client device comprises a current IP address associated with the client device; and at least one device comparison feature comprises a distance between a first location associated with the historical IP address and a second location associated with the current IP address.

15. A system comprising:

at least one processor; and at least one non-transitory computer-readable storage medium storing instructions that, when executed by the at least one processor, cause the system to:

receive, from a client device, a request to access a secure digital account;

determine one or more extracted features associated with the client device;

generate, utilizing a digital security machine-learning model, a take-over score based on the one or more extracted features;

upon determining that the take-over score satisfies a take-over threshold, allowing access to the secure digital account by providing, for display via the client device, a first selectable option for a first feature, and a second selectable option for a second feature;

in response to receiving, from the client device, a first selection of the first selectable option, execute the first feature based on the take-over score and based on the first feature being a first type;

in response to receiving, from the client device, a second selection of the second selectable option, prohibit execution of the second feature based on the take-over score and the second feature being a second type; and provide, on the client device, a notification that the second feature is unavailable.

16. The system of claim 15, wherein determining the one or more extracted features associated with the client device comprises:

identifying an IP address associated with the client device; and determining a time zone associated with a location corresponding to the IP address.

17. The system of claim 15, wherein determining the one or more extracted features associated with the client device comprises:

determining a number of secure accounts the client device attempted to access; or determining a number of failed logins from an IP address associated with the client device.

18. The system of claim 15, further comprising instructions that, when executed by the at least one processor, cause the system to:

identify a first threshold based on the first feature being the first type, and wherein executing the first feature based on the take-over score comprises comparing the take-over score to the first threshold; and identify a second threshold based on the second feature being the second type, and wherein prohibiting executing of the second feature based on the take-over score comprises comparing the take-over score to the second threshold.

19. The system of claim 15, further comprising instructions that, when executed by the at least one processor, cause the system to:

determine one or more historical client device features associated with the secure digital account;

determine one or more device comparison features by comparing the one or more historical client device features with the one or more extracted features associated with the client device; and wherein the take-over score is based at least in part on the one or more device comparison features.

20. The system of claim 19, wherein:

at least one historical client device feature comprises a historical IP address associated with the secure digital account:

at least one extracted feature associated with the client device comprises a current IP address associated with the client device; and at least one device comparison feature comprises a distance between a first location associated with the historical IP address and a second location associated with the current IP address.

\*  \*  \*  \*  \*